United States Patent
Singh et al.

(10) Patent No.: US 10,979,480 B2
(45) Date of Patent: *Apr. 13, 2021

(54) METHODS AND SYSTEMS FOR COMMUNICATING INFORMATION CONCERNING STREAMING MEDIA SESSIONS

(71) Applicant: 8x8, Inc., Campbell, CA (US)

(72) Inventors: Varun Singh, Helsinki (FI); Jörg Ott, Munich (DE); Marcin Nagy, Helsinki (FI); Navid Khajehzadeh, Espoo (FI)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/421,549

(22) Filed: May 24, 2019

(65) Prior Publication Data

US 2019/0281103 A1    Sep. 12, 2019

Related U.S. Application Data

(63) Continuation-in-part of application No. 15/293,428, filed on Oct. 14, 2016, now Pat. No. 10,333,996.

(51) Int. Cl.
| | |
|---|---|
| H04L 29/06 | (2006.01) |
| H04L 12/24 | (2006.01) |
| H04L 12/26 | (2006.01) |

(52) U.S. Cl.
CPC ........ *H04L 65/80* (2013.01); *H04L 29/06523* (2013.01); *H04L 41/0686* (2013.01);
(Continued)

(58) Field of Classification Search
CPC ....... H04L 41/50–5025; H04L 41/5032–5038; H04L 43/00–12; H04L 65/1066;
(Continued)

(56) References Cited

U.S. PATENT DOCUMENTS

| | | | |
|---|---|---|---|
| 7,076,547 B1 | 7/2006 | Black | |
| 7,379,999 B1 * | 5/2008 | Zhou | G06F 11/3476 709/224 |

(Continued)

FOREIGN PATENT DOCUMENTS

EP    3310000 A1    4/2018

OTHER PUBLICATIONS

"Network Delay" from Wikipedia, Retrieved May 21, 2019 from https://en.wikipedia.org/wiki/Network_delay, 1 page.

(Continued)

*Primary Examiner* — Brendan Y Higa
(74) *Attorney, Agent, or Firm* — Crawford Maunu PLLC

(57) ABSTRACT

A method for improving performance of a streaming media session between a plurality of communicating entities. Observation reports are collected from a plurality of monitoring entities. Each observation report includes information pertaining to events observed and recorded at a corresponding monitoring entity. A size of at least one window to be used for analyzing the observation reports is determined. The observation reports are analyzed using the at least one window of the determined size, to determine a correlation between the events across the observation reports. A problem encountered during the streaming media session is identified, based upon the correlation between the events. A notification is sent to at least one of the monitoring entities, based upon the problem. The notification is sent during the streaming media session.

30 Claims, 7 Drawing Sheets

(52) U.S. Cl.
CPC ...... *H04L 41/5025* (2013.01); *H04L 41/5032* (2013.01); *H04L 43/04* (2013.01); *H04L 43/062* (2013.01); *H04L 43/067* (2013.01); *H04L 65/4069* (2013.01)

(58) Field of Classification Search
CPC ....... H04L 29/06523; H04L 29/06884–06897; H04L 65/80
See application file for complete search history.

(56) References Cited

U.S. PATENT DOCUMENTS

| | | | | |
|---|---|---|---|---|
| 9,106,887 | B1* | 8/2015 | Owen | H04N 19/102 |
| 9,363,209 | B1* | 6/2016 | Akins, III | H04L 49/9078 |
| 2003/0086422 | A1* | 5/2003 | Klinker | H04L 29/06 370/389 |
| 2004/0073690 | A1* | 4/2004 | Hepworth | H04L 47/745 709/230 |
| 2004/0199828 | A1* | 10/2004 | Cabezas | G06F 11/261 714/39 |
| 2005/0138111 | A1* | 6/2005 | Aton | G06F 11/3476 709/201 |
| 2005/0204052 | A1* | 9/2005 | Wang | H04L 47/10 709/231 |
| 2005/0278703 | A1 | 12/2005 | Lo et al. | |
| 2006/0268700 | A1* | 11/2006 | Clark | H04L 47/127 370/230 |
| 2008/0031145 | A1* | 2/2008 | Ethier | H04L 45/28 370/248 |
| 2008/0137552 | A1* | 6/2008 | Lee | H04L 41/5087 370/252 |
| 2009/0167520 | A1* | 7/2009 | Watanabe | H04L 41/065 340/507 |
| 2010/0100775 | A1* | 4/2010 | Slutsman | G06F 11/079 714/47.2 |
| 2011/0243001 | A1* | 10/2011 | Yang | H04M 3/2236 370/252 |
| 2012/0151009 | A1* | 6/2012 | Bouazizi | H04L 43/08 709/219 |
| 2012/0170761 | A1* | 7/2012 | Ozawa | H04L 65/80 381/56 |
| 2012/0191872 | A1* | 7/2012 | Prime | H04L 65/1006 709/239 |
| 2013/0100859 | A1* | 4/2013 | Martin | H04L 43/04 370/259 |
| 2014/0006612 | A1* | 1/2014 | Fallon | H04L 41/5032 709/224 |
| 2014/0029462 | A1* | 1/2014 | Stewart | H04L 43/08 370/252 |
| 2014/0136690 | A1* | 5/2014 | Jain | H04L 41/5012 709/224 |
| 2015/0295775 | A1* | 10/2015 | Dickey | H04L 41/046 715/735 |
| 2015/0304191 | A1* | 10/2015 | Groenendijk | H04L 41/5032 370/252 |
| 2016/0226731 | A1* | 8/2016 | Maroulis | G06F 11/3006 |
| 2017/0250882 | A1* | 8/2017 | Kellicker | H04L 67/16 |
| 2019/0034489 | A1* | 1/2019 | Ziegler | G06F 16/2455 |

OTHER PUBLICATIONS

EPO. International Search Report and Written Opinion dated Jan. 23, 2020 for PCT Application No. PCT/FI2019/050405 of the common Applicant (Callstats I/O OY), 11 pages.

* cited by examiner

METHODS AND SYSTEMS FOR COMMUNICATING INFORMATION CONCERNING STREAMING MEDIA SESSIONS

CROSS-REFERENCE TO RELATED APPLICATIONS

This application is a continuation-in-part of U.S. patent application Ser. No. U.S. Ser. No. 15/293,428, titled "METHODS AND SYSTEMS FOR ANALYZING STREAMING MEDIA SESSIONS" and filed on Oct. 14, 2016, which is incorporated herein by reference.

TECHNICAL FIELD

The present disclosure relates to methods for improving performance of at least one streaming media session between a plurality of communicating entities. Moreover, the present disclosure relates to systems for improving performance of at least one streaming media session between a plurality of communicating entities.

BACKGROUND

Communication services are increasingly being provided over data communication networks and especially the Internet today. The communication services are becoming richer in functionality with respect to:
- the diversity of media (from a single medium to multimedia),
- the fidelity of media (from a low quality to a higher quality for at least one type of media from amongst various different types of media),
- the number of entities involved in a communication (from two to many),
- the duration of the communication (from a few minutes to hours or even days), and
- the context of the communication (from a dedicated phone using a specific apparatus to software applications executing on a multi-purpose device, for example, such as a computer, to being embedded in another software application).

These communication services may be offered in various ways and context. As an example, a given communication service may be offered as:
- a stand-alone service (for example, such as Google® hangout, Skype® and the like),
- a part of a business, another service or a shop offering to support, interact with and bind customers, for example, for pre-sales and/or post-sales activities,
- an element of a team communication application, a workflow management system or a groupware system, or nested in or embedded within another service.

These communication services are increasingly gaining broader acceptance. As more diverse services are being offered, the number of service providers is growing. Accordingly, the number of users is also growing, and hence the number of calls is growing.

While the growth in rich communication over data communication networks, such as the Internet, places increasing demands on the capacity, reliability and flexibility of the data communication networks, the Internet has not been built with considerations of such advanced applications in mind (which occurred only decades after its inception).

As a result, developers and providers of the aforesaid communication services (namely, Communication Service Providers; CSP) have been facing a requirement to:
- design their systems and services in a manner that would allow operation in an unknown and unpredictable networking environment having no guarantees,
- design their systems and services in a manner that would allow operation in a dynamically changing environment, where changes could be due to:
  - other communication services being active at the same time,
  - changes in the network load as a result of commencing and/or terminating of other calls,
  - changes in the network load as a result of their own actions (and other reactions to their actions),
  - changes in a network topology and the network capacity due to mobility or node failures or interference of external forces with elements of wired or wireless communication networks,
  - physical properties of a channel being used, for example, for wireless communication networks, and
  - user mobility, for example, such as a change in location, velocity and so forth (which, in turn, may affect the channel).

In such an unpredictable and dynamically changing network environment with a variety of communication services, there arises a need for the Communication Service Providers (CSPs) to be able to measure the quality of their service to identify and mend bottlenecks in their service infrastructure.

There exist techniques for analyzing streaming media distribution and determining multimedia call performance. Conventionally, software may be written to monitor throughput, packet loss and other networking parameters that affect perceived performance of a call.

However, the performance of the call as measured at endpoints does not tell where the problem is in the data communication network. From an end-to-end distribution point of view, it is better to identify the bottleneck or the source of the problem in the network elements/paths/connections, so that it can potentially be remedied. This can be done by identifying a particular session and collecting time-stamped information related to jitter, packet loss, etc. in potentially every network node for that particular session. Moreover, it may be beneficial to monitor multiple sessions and to collect time-stamped information related to the multiple sessions.

While packet streams related to a communication session can be identified and information pertaining to these packet streams can be collected, there is a problem in finding a correlation in the collected information, which is required to identify the source of the problem.

Moreover, collecting and processing such information on packet data networks easily results in a huge amount of data, be it for a single communication session or across multiple communication sessions. This makes it impractical to correlate the collected information, as a large amount of computational resources, namely memory and processing capability, is required to process such a huge amount of data.

SUMMARY

The present disclosure seeks to provide a method for improving performance of at least one streaming media session between a plurality of communicating entities. The present disclosure also seeks to provide a system for improving performance of at least one streaming media session between a plurality of communicating entities. An aim of the present disclosure is to provide a solution that overcomes at least partially the problems encountered in the prior art.

In a first aspect, embodiments of the present disclosure provide a method for improving performance of at least one streaming media session between a plurality of communicating entities, the method comprising:

collecting a plurality of observation reports from a plurality of monitoring entities, a given observation report comprising information pertaining to events observed and recorded at a corresponding monitoring entity, wherein the plurality of observation reports are collected by at least one reporting entity;

determining a size of at least one window to be used for analyzing the plurality of observation reports;

analyzing the plurality of observation reports using the at least one window of the determined size, to determine a correlation between the events across the plurality of observation reports;

identifying, based upon the correlation between the events, a problem encountered during the at least one streaming media session; and sending at least one notification to at least one of the plurality of monitoring entities, based upon the problem, wherein the at least one notification is sent during the at least one streaming media session.

In a second aspect, embodiments of the present disclosure provide a system for improving performance of at least one streaming media session between a plurality of communicating entities, the system comprising at least one reporting entity that is configured to:

collect a plurality of observation reports from a plurality of monitoring entities, a given observation report comprising information pertaining to events observed and recorded at a corresponding monitoring entity;

determine a size of at least one window to be used for analyzing the plurality of observation reports;

analyze the plurality of observation reports using the at least one window of the determined size, to determine a correlation between the events across the plurality of observation reports;

identify, based upon the correlation between the events, a problem encountered during the at least one streaming media session; and send at least one notification to at least one of the plurality of monitoring entities, based upon the problem, wherein the at least one notification is to be sent during the at least one streaming media session.

Embodiments of the present disclosure substantially eliminate or at least partially address the aforementioned problems in the prior art, and facilitate a correlation between events reported by distributed, non-synchronized monitoring entities, thereby enabling corrective actions to be taken whilst a given streaming media session is still on-going.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1A:
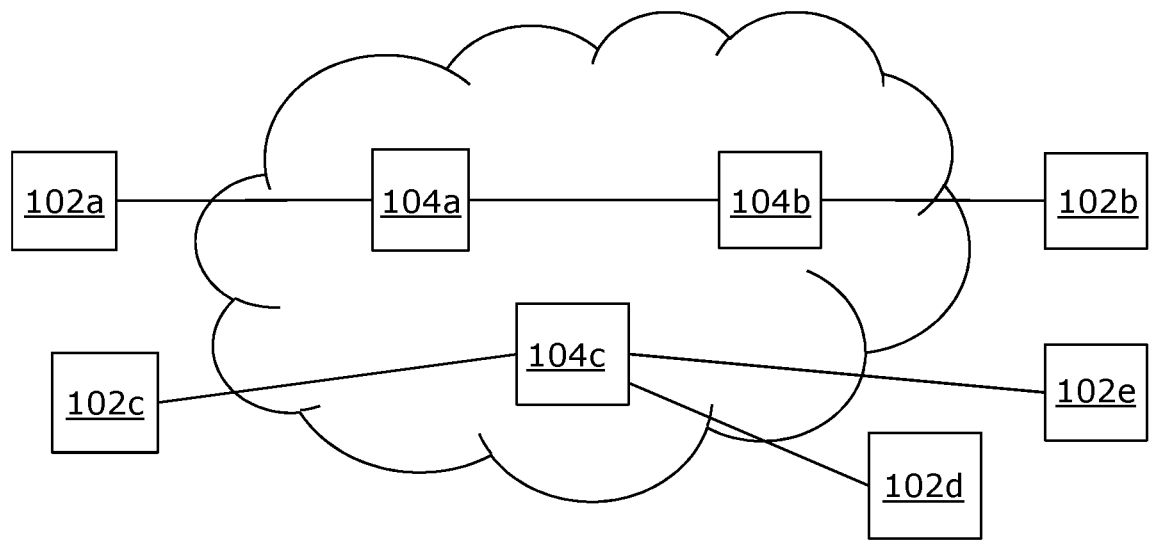
FIGS. 1A and 1B collectively are a schematic illustration of a network environment, wherein a system for improving performance of at least one streaming media session between a plurality of communicating entities is implemented pursuant to embodiments of the present disclosure.

In the accompanying drawings, an underlined number is employed to represent an item over which the underlined number is positioned or an item to which the underlined number is adjacent.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Glossary

Brief definitions of terms used throughout the present disclosure are given below.

The terms "call" and "conference" generally refer to any one of:
- an interaction between two or more user entities over a data communication network in which the user entities exchange information of at least one medium (modality),
- an interaction between at least one user entity and at least one automated entity, or
- an interaction between two or more automated entities.

Throughout the present disclosure, the terms "call" and "conference" have been used interchangeably.

The interaction during a call may occur synchronously (namely, simultaneously for all involved entities) or asynchronously (namely, in a time-shifted manner). The term "synchronous call" generally refers to a call in which at least one part of information is received, processed and rendered by at least one receiving entity, whilst at least one other part of the information is processed and transmitted by at least one transmitting entity, wherein said information belongs together and is exchanged between the at least one receiving entity and the at least one transmitting entity as a part of the same call. In other words, during the call, an act of receiving the at least one part of the information is performed contemporaneously with an act of transmitting the at least one other part of the information. The term "asynchronous calls" generally refers to calls that are not synchronous (namely, as per the aforementioned definition of "synchronous calls").

The term "medium" generally refers to any one of:
- a digital representation of audio or speech data or audible noise,
- a digital representation of video or sequences of still images,
- a digital representation of written text, still image, drawings, or other information,
- a digital representation of measured instantaneous physical properties, for example including, but not limited to, brightness, temperature, velocity, acceleration, position, direction, presence or composition of chemical substances (for example, such as air, water and so forth),
- a digital representation of computer-generated properties (for example, such as virtual environments) as, for example, in games or simulations, or
- a digital representation of instructions to be carried out in a physical environment or a virtual environment or a composite environment.

Notably, media may comprise discrete or continuous contents, or a combination of both. Media content is optionally transmitted as one or more data units encapsulated in Internet Protocol (IP) packets (namely, IPv4 and IPv6). Those skilled in the art will appreciate that other communication protocols, including, but not limited to, cellular networks and information-centric networks, may be used to carry such data units.

The term "media stream" generally refers to a flow of packets that represent media content. A media stream comprises a plurality of packets being transmitted via a data communication network, wherein the plurality of packets share one or more common properties (for example, such as source and destination addresses).

The term "streaming media session" generally refers to a communication session in which participating entities communicate media streams therebetween.

The term "packet" generally refers to a data packet that is communicated from a given transmitting entity to a given receiving entity. The term "packet" encompasses both media packets as well as non-media packets.

A media packet comprises media of at least one type. Optionally, a media packet comprises at least one of: audio data, video data, image data. Audio, video and other types of media may be conveyed within a same media packet, or may be spread across different media packets.

On the other hand, a non-media packet is a control packet that is optionally exchanged between two communicating entities as a part of a media stream. Zero, one, or more non-media packets are exchanged between the two communicating entities, possibly in each direction. Such non-media packets are optionally used to determine whether or not the two communicating entities can communicate with each other via a given data communication network. It will be appreciated that non-media packets can be exchanged at the beginning of a streaming media session as well as during the streaming media session. In other words, non-media packets can precede as well as be interspersed with media packets.

The term "session parameters" generally refers to a set of parameters associated with a given streaming media session, wherein the session parameters are used to identify packets in a media stream being monitored during the given streaming media session.

The term "user entity" generally refers to a functional entity (for example, such as an executed software program) operating on behalf of and interacting with a local (namely, co-located) user to allow the user to establish media communication with at least one other entity. An example of a user entity is a web browser running on a user device and executing program instructions of a multimedia (namely, audio/video) communication endpoint. Another example of a user entity is a dedicated application or "App" running on a user device and executing program instructions of a multimedia communication endpoint.

The term "automated entity" generally refers to a functional entity that operates automatically, without any intervention by a local user. An automated entity may be a source or a sink of packets, or an intermediary between two other entities. An automated entity may also process (for example, combine, replicate, transform and so forth) and interpret the packets received thereat. Examples of an automated entity include, but are not limited to, a conference server, a video server, a streaming media server, a video surveillance unit, a surveillance camera, a voice recorder, a voice mailbox, an Interactive Voice-Response (IVR) unit, a data center (for example, such as a data center that processes multimedia data received thereat), a callbot, a unit that processes media, a unit that forwards media, a unit that replicates media and a unit that terminates media received from another entity. In some implementations, an automated entity could be a source of media, for example, such as a microphone, an image sensor or other types of sensors that are configured to measure properties (for example, such as temperature, acceleration, and so forth). In other implementations, an automated entity could be a generator of augmented reality or virtual reality content, which is represented by one or more types of media.

The term "communicating entity" generally refers to an entity that sources and/or sinks one or more media streams. A communicating entity could be a user entity or an automated entity that is communicating with another entity.

The term "network entity" generally refers to a functional entity that neither sources nor sinks media streams, but forwards media streams. Such forwarding may include address translation, for example, such as Network Address Translation (NAT). As an example, the address translation could be implemented by a Traversal Using Relays around NAT (TURN) server. A network entity may observe at least a part of the media streams.

The term "monitoring entity" generally refers to an entity that observes and records events occurring during a given streaming media session. A monitoring entity is typically a logical function that may be implemented in hardware, software, firmware or a combination thereof, and that may be co-located with any one of: a user entity, an automated entity or a network entity. A monitoring entity may record observations independently or in cooperation with functions of its co-located entity. For this purpose, the monitoring entity may observe various properties at different levels of an Operating System and a networking stack. The monitoring entity may also store data of the observations recorded thereat. The monitoring entity processes the data of the observations to identify events, and generates observation reports including information pertaining to the events.

The term "reporting entity" generally refers to an entity that collects observation reports from other entities (namely, monitoring entities or other reporting entities) in a hierarchical manner. A reporting entity may process and/or store the observation reports. The reporting entity may forward the observation reports in their original or processed form to another reporting entity. Optionally, a reporting entity is a logical function that may be implemented in hardware, software, firmware or a combination thereof, and that may be co-located with a monitoring entity or another reporting entity. Alternatively, optionally, a reporting entity is implemented by way of a separate server. Moreover, optionally, a reporting entity controls other entities (for example, tells monitoring entities which calls to monitor, with what kind of session parameters, and so on).

The term "device clock" encompasses an Operating System (OS) clock or a hardware clock associated with a given entity.

The term "global clock" generally refers to any type of clock that provides precise information about current time. A global clock is typically used to synchronize device clocks of various communication devices. Examples of the global clock include, but are not limited to, an atomic reference clock and a Global Positioning System (GPS) based clock.

The term "marker" generally refers to a parameter whose value increases in a monotonic manner. Optionally, a marker is a packet sequence number (or a frame number) that is assigned by a transmitting entity to each packet (or each frame) originating therefrom, wherein packet sequence numbers are assigned in a monotonically-increasing manner. Alternatively, optionally, a marker is a timestamp that is assigned by a transmitting entity to each packet originating therefrom; the timestamp is not related to an absolute device clock associated with the transmitting entity, but is media-related. Such media-related timestamps are not required to be strictly monotonically increasing, but may be monotonically increasing only within a time period that is substantially longer than a Round-Trip Delay (RTD) between the transmitting entity and a given receiving entity. In practice, a digital representation of a marker may be subject to wrap around when a predefined limit of its representation is reached; such limits may, for example, be implemented in a manner that is similar to 32-bit representations of Unix time (measured in seconds since 1 Jan. 1970, 00:00, which will wrap around in January 2038). This finite representation does not affect the suitability of markers for purposes of embodiments of the present disclosure.

The term "marker-line" is analogous to the term "timeline". On a marker-line, markers are arranged in an ascending order of their values. Optionally, when packet sequence numbers (or frame numbers) are used as markers, the marker-line is a series of packet sequence numbers (or frame numbers) assigned by a given transmitting entity. Likewise, optionally, when media-related timestamps are used as markers, the marker-line is a series of media-related timestamps assigned by a given transmitting entity.

The term "server" generally refers to an application, program, process or device in a client/server relationship that responds to requests for information or services by another application, program, process or device (namely, a client) on a data communication network. The term "server" also encompasses software that makes the act of serving information or providing services possible.

The term "client" generally refers to an application, program, process or device in a client/server relationship that requests information or services from another application, program, process or device (namely, a server) on a communication network. Importantly, the terms "client" and "server" are relative, since an application may be a client to one application but a server to another application. The term "client" also encompasses software that makes the connection between a requesting application, program, process or device and a server possible, such as an FTP client.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed therebetween, while not sharing any physical connection with one another. Based upon the present disclosure provided herein, one of ordinary skill in the art will appreciate a variety of ways in which connection or coupling exists in accordance with the aforementioned definition.

The terms "first", "second", and the like, herein do not denote any order, quantity or importance, but rather are used to distinguish one element from another. Furthermore, the terms "a" and "an" herein do not denote a limitation of quantity, but rather denote the presence of at least one of the referenced item.

The phrases "in an embodiment", "according to an embodiment" and the like generally mean that a particular feature, structure, or characteristic following the phrase is included in at least one embodiment of the present disclosure, and may be included in more than one embodiment of the present disclosure. Importantly, such phrases do not necessarily refer to the same embodiment.

If the specification states that a particular component or feature "may", "can", "could", or "might" be included or have a characteristic, that particular component or feature is not required to be included or to have the characteristic.

EMBODIMENTS OF THE PRESENT DISCLOSURE

In a first aspect, embodiments of the present disclosure provide a method for improving performance of at least one streaming media session between a plurality of communicating entities, the method comprising:

collecting a plurality of observation reports from a plurality of monitoring entities, a given observation report comprising information pertaining to events observed and recorded at a corresponding monitoring entity, wherein the plurality of observation reports are collected by at least one reporting entity;

determining a size of at least one window to be used for analyzing the plurality of observation reports;

analyzing the plurality of observation reports using the at least one window of the determined size, to determine a correlation between the events across the plurality of observation reports;

identifying, based upon the correlation between the events, a problem encountered during the at least one streaming media session; and sending at least one notification to at least one of the plurality of monitoring entities, based upon the problem, wherein the at least one notification is sent during the at least one streaming media session.

In a second aspect, embodiments of the present disclosure provide a system for improving performance of at least one streaming media session between a plurality of communicating entities, the system comprising at least one reporting entity that is configured to:

collect a plurality of observation reports from a plurality of monitoring entities, a given observation report comprising information pertaining to events observed and recorded at a corresponding monitoring entity;

determine a size of at least one window to be used for analyzing the plurality of observation reports;

analyze the plurality of observation reports using the at least one window of the determined size, to determine a correlation between the events across the plurality of observation reports;

identify, based upon the correlation between the events, a problem encountered during the at least one streaming media session; and send at least one notification to at least one of the plurality of monitoring entities, based upon the problem, wherein the at least one notification is to be sent during the at least one streaming media session.

Embodiments of the present disclosure provide the aforementioned method and system for improving the performance of the at least one streaming media session between the plurality of communicating entities. The aforementioned method and system allow for correlating the events reported by distributed, non-synchronized monitoring entities, thereby enabling corrective actions to be taken whilst the at least one streaming media session is still on-going. Narrowing down a search space for analyzing the plurality of observation reports allows near real-time operation.

Optionally, the at least one notification comprises instructions to perform a corrective action. As an example, the instructions can be sent to a transmitting entity, for example such as a media encoder, to perform a corrective action, for example such as changing a bit rate or a resolution of media content being communicated during the at least one streaming media session. As another example, the instructions can be sent to a network entity to perform a corrective action, for example such as re-routing packets.

As an example of the complexity of the problem being solved pursuant to embodiments of the present disclosure, picture a webcast of large multinational company that involves thousands of simultaneous listeners, possibly ten thousand network elements in a data communication network, geographically spanning continents and a multitude of Communication Service Providers (CSPs), Internet Service Providers (ISPs), operators and the like. The aforementioned method and system enable improving a Quality-of-Service (QoS) and a user-perceived Quality-of-Experience (QoE) during the webcast, by proposing a corrective action to be performed for any of the listeners suffering from bad reception.

The aforementioned method and system can be beneficially implemented by ISPs and CSPs for managing and maintaining their service operations effectively and possibly for interaction with other service providers. As an example, the method and system can be implemented by the ISPs and the CSPs for purposes of measuring the performance of their media relay servers, media gateways, conference bridges and the like in real-time or near real-time. As another example, a CSP may use the aforementioned method and system to improve the performance of calls, wherein at least one of following subsets of calls may be selected for joint inspection:

individual calls, calls of individual users or groups of users belonging to a same communication service (offered by one CSP) or different communication services (offered by different CSPs), calls between communicating entities belonging to a certain offering of a corporation that provides multimedia communication services for end users (the corporation being referred to as a User Service Provider (USP), wherein the USP is considered logically different from a CSP), calls between communicating entities using a same ISP or different ISPs, groups of calls belonging to a communication service offered by one CSP, groups of calls belonging to different communication services offered by different CSPs.

It will be appreciated that users, USPs, CSPs and ISPs may have following relationships:

users may use one or more ISPs, users may use one or more USPs,

USPs may use one or more CSPs,

CSPs support multiple USPs, and

CSPs may use one or more ISPs.

For illustration purposes only, there will now be considered an example in which communicating entities 'A' and 'B' are on different ISPs 'A1' and 'B1', respectively, wherein A calls B using a call service provided by a corporation 'XYZ' (namely, a USP) that utilizes a CSP. Observation reports from monitoring entities comprising at least two of: A, B, at least one network entity on ISP 'A1', at least one network entity on ISP 'B1' are analyzed to determine a correlation between events recorded in the observation reports. In such a case, events related to at least one of the following may be correlated:

all calls made by A or received by A, all calls between A and B, all calls involving ISP 'A1' or ISP 'B1' or all calls involving both ISPs 'A1' and 'B1', all calls of a certain USP or all calls of a certain USP operated by a certain CSP, all calls done via a certain CSP, all calls traversing a certain set of Autonomous Systems (ASes), all calls originating or terminating or traversing a certain geographic region (for example, a country) or a certain topological region (for example, an AS).

Pursuant to embodiments of the present disclosure, the method is implemented by the at least one reporting entity. Optionally, the at least one reporting entity is co-located with at least one of the plurality of monitoring entities. Alternatively, optionally, the at least one reporting entity is implemented by way of a server arrangement comprising at least one server. The server arrangement comprises at least one server and at least one database associated with the at least one server. In one implementation, the at least one server and the at least one database are implemented by way of cloud computing services.

Optionally, the plurality of monitoring entities comprise at least one of:
- at least one of the plurality of communicating entities,
- at least one network entity forwarding at least one media stream between the plurality of communicating entities.

Optionally, the at least one reporting entity is configured to collect at least one of the plurality of observation reports from at least one of the plurality of monitoring entities, via at least one other reporting entity. Optionally, in such a case, the at least one other reporting entity is configured to forward, to the at least one reporting entity, the at least one of the plurality of observation reports in its original form (namely, in a form in which the at least one of the plurality of observation reports was received from the at least one of the plurality of monitoring entities). Alternatively, optionally, the at least one other reporting entity is configured to process the at least one of the plurality of observation reports at least partially, and forward, to the at least one reporting entity, the at least one of the plurality of observation reports in a processed form.

It will be appreciated that the aforesaid processing of the at least one of the plurality of observation reports can be performed at a single entity or can be distributed across several entities. Optionally, the at least one of the plurality of observation reports is processed in multiple stages at different entities. Optionally, in this regard, the at least one of the plurality of observation reports is processed at least in part at the plurality of monitoring entities and/or the at least one other reporting entity. Optionally, such processing is performed for local consumption, namely at the plurality of monitoring entities and/or the at least one other reporting entity, and/or for reporting to another entity that is at a higher hierarchy level.

In some implementations, the at least one reporting entity is coupled in communication with the plurality of monitoring entities via a data communication network. The data communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, fifth generation (5G) telecommunication networks, community networks, satellite networks, vehicular networks, sensor networks, and Worldwide Interoperability for Microwave Access (WiMAX) networks. Such networks may run the Internet Protocol (IP), an information-centric protocol, or other protocols to achieve a desired data communication.

Moreover, the plurality of communicating entities are communicably coupled with each other via the data communication network.

Optionally, the plurality of communicating entities comprise at least one user entity. Examples of devices associated with the at least one user entity include, but are not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, desktop computers and large-sized touch screens with embedded PCs. Some specific examples of such devices include, but are not limited to, iPhone®, iPad®, Android® phone, Android® web pad, Windows® phone and Windows® web pad.

Optionally, the plurality of communicating entities comprise at least one automated entity. Examples of devices associated with the at least one automated entity include, but are not limited to, a conference server, a video server, a streaming media server, a video surveillance unit, a surveillance camera, a voice recorder, a voice mailbox, an IVR unit, a data center and a call bot.

Moreover, optionally, the plurality of monitoring entities are configured to deliver, to the at least one reporting entity, the plurality of observation reports in a form of data streams (hereinafter referred to as "report streams", for the sake of convenience only). Optionally, in such a case, a given observation report may be delivered as a report stream comprising discrete information pertaining to discrete events.

As an example, when a first communicating entity and a second communicating entity participate in a synchronous call, both of the first and second communicating entities transmit and receive packets contemporaneously. If, in such a case, both of the first and second communicating entities are configured to act as monitoring entities, multiple "transmission events" and "reception events" would be observed and recorded at both of the first and second communicating entities (acting as monitoring entities) in their respective observation reports. In such a case, a report stream (namely, an observation report) received from a given communicating entity would include discrete information pertaining to discrete transmission/reception events occurring at the given communicating entity.

Correlating Events:

Beneficially, the correlation between the events is indicative of:
- which event(s) in a given observation report is correlated to which event(s) in other observation report(s), and/or
- which event(s) in the given observation report is not correlated to any other event in the other observation report(s).

For illustration purposes only, there will now be considered some examples of the correlation between the events, and how it helps in determining the problem encountered during the at least one streaming media session.

In a first example, there will now be considered how a correlation of a one-way packet-loss event between a transmitting entity and a receiving entity or across multiple receiving entities can be determined based upon an analysis of observation reports related to a single flow direction.

For point-to-point communication (namely, between the transmitting entity and the receiving entity), it is determined whether or not two or more monitoring entities (for example, a monitoring entity co-residing with a network entity in a proximity of the transmitting entity and a monitoring entity co-residing with the receiving entity) record a same packet-loss event in a single direction. This enables the at least one reporting entity to determine a network segment in which the packet loss occurred. If the same packet-loss event has been observed at the two or more monitoring entities, it is determined that there is a problem in a network segment in the proximity of the transmitting entity. Otherwise, if the same packet-loss event has been observed only in a proximity of the receiving entity (but not by said monitoring entity co-residing with said network entity in the proximity of the transmitting entity), it is likely that there is a problem in a network segment in the proximity of the receiving entity.

For group communication (namely, between more than two communicating entities), it is determined whether or not monitoring entities (for example, monitoring entities co-residing with receiving entities) record a same packet-loss event in a single direction. Notably, an upstream loss (namely, a packet loss in a proximity of a transmitting entity) appears at each receiving entity, whereas downstream losses only affect a subset of the receiving entities.

In a second example, there will now be considered how a correlation of packet delivery characteristics in both directions between two communicating entities can be determined based upon an analysis of observation reports related to both flow directions.

If latency (or packet loss) changes in bursts, it may indicate an instant congestion somewhere inside the data communication network.

If the two flow directions are not correlated, reasons behind the bursts may be independent.

If the two flow directions are correlated, so may be the reasons. As an example, a wireless access network (that is used for both transmission and reception) may be experiencing an increase in load, which may have caused medium access delays and potentially interference-induced losses.

It will be appreciated that the aforementioned examples are for illustration purposes only. A person skilled in the art will recognize many variations, alternatives, and modifications of these examples.

Moreover, it will be appreciated that the process of correlating the events across the plurality of observation reports is not straightforward, and involves various concerns and issues, for example, as mentioned below. In operation, the monitoring entities record the information pertaining to the events in a distributed manner. A given monitoring entity has its own local view on time, and optionally records the information pertaining to the events as a function of its local time. Device clocks of the monitoring entities may not be synchronized and may exhibit their own clock drift relative to other monitoring entities. Even if the device clocks of these monitoring entities are synchronized with a global clock, the synchronization may be coarse, namely the device clocks may differ slightly. Moreover, the device clocks exhibit a skew over a period of time, and require continuous readjustment. Furthermore, the device clocks of the monitoring entities may jump time unpredictably, due to external events; as an example, a Network Time Protocol (NTP) sync after a device bootup may make a device clock to jump by more than 45 years.

Moreover, the monitoring entities may not be able to assess whether or not their device clocks are synchronized and to which extent their device clocks are synchronized. As a result, there is no common reference point in time for analyzing the plurality of observation reports, when the information pertaining to the events is recorded as a function of respective local time at the plurality of monitoring entities.

Furthermore, during the at least one streaming media session, packets in flight between a transmitting entity and a receiving entity will travel for some time before reaching the receiving entity. As a result, a "transmission event" observed at global time 't1' at the transmitting entity may correlate to a "reception event" observed at global time 't2' (=t1+delta_t) at the receiving entity. This One-Way Delay (OWD; namely delta_t) between the transmitting entity and the receiving entity is not constant, namely is time-varying, due to a presence or absence of network congestion at different instants of time, among other reasons. When analyzing the plurality of observation reports, the OWD between the transmitting entity and the receiving entity is optionally taken into account depending on a type of event observed. As an example, the OWD could be taken into account to correlate transmission and reception events recorded at different monitoring entities.

Moreover, as the OWD between the transmitting entity and the receiving entity is time-varying, time intervals during which transmission and reception events for a given packet are observed can also vary. In such a case, if the reporting entity employs a constant report-collection interval for collecting the observation reports, different numbers of observed events would be yielded during different report-collection intervals. Alternatively, if the transmitting and receiving entities coordinate on transmission/reception events of a certain number of packets, the reporting entity could employ varying report-collection intervals. Optionally, such varying report-collection intervals can be dynamically adjusted. It will be appreciated that lost and unrepaired packets may require additional steps for the coordination between the transmitting and receiving entities.

Optionally, the report-collection interval is varied as a function of at least one of:
 a storage space available for storing the observation reports at the at least one reporting entity,
 quality metrics observed for the at least one streaming media session (for example, such as a bit rate, a loss rate, and so on),
 an observed load of the at least one reporting entity,
 an observed network load of a path between a given monitoring entity and the at least one reporting entity,
 a rule set that is determined based upon instructions provided to the at least one reporting entity.

Moreover, correlating the events across the plurality of observation reports becomes more complex when more than two monitoring entities are involved. An order in which the observation reports are received (from the monitoring entities) at the at least one reporting entity may also change from time-to-time. Therefore, the at least one reporting entity optionally takes into consideration a waiting time for which the at least one reporting entity waited to collect the plurality of observation reports (namely, the waiting time for which the at least one reporting entity collected the plurality of observation reports prior to reconciling and processing the observation reports for the aforementioned analysis).

Furthermore, correlating the events across the plurality of observation reports becomes even more complex when at least one of the plurality of monitoring entities is not a communicating entity, but a network entity. This is in part due to a fact that a given network entity can observe packets only "on the wire". In other words, the given network entity has only limited access to data contained in the packets, namely to data contained in unencrypted parts (for example, packet headers) of these packets); whereas a given communicating entity has full access to all the bits of the packets, namely after decryption or prior to encryption.

Moreover, collecting the plurality of observation reports from the plurality of monitoring entities also takes some time. This may be due to at least one of:
 respective OWDs from the plurality of monitoring entities to the at least one reporting entity, respective packet losses occurring during the delivery of the plurality of observation reports from the plurality of monitoring entities to the at least one reporting entity, delays in processing the plurality of observation reports at corresponding monitoring entities and/or at the at least one reporting entity.

It will be appreciated that the OWDs from different monitoring entities to the at least one reporting entity may be different, due to different network paths and latencies associated therewith. Moreover, the OWD from a given monitoring entity to the at least one reporting entity is time-varying, due to a presence or absence of network congestion at different instants of time. As a result, an overall latency in collecting the plurality of observation reports at the at least one reporting entity from different monitoring entities is usually time-varying. Thus, in order to determine the correlation between the events recorded in the plurality of observation reports, the at least one reporting entity optionally takes into consideration the abovementioned delays.

For illustration purposes only, there will now be considered a first example scenario wherein communicating entities 'A' and 'B' receive packets from a conference bridge 'C' during a streaming media session, and are configured to act as monitoring entities. One such example scenario has been illustrated in conjunction with FIG. 2A, for example as described below. A One-Way Delay (OWD) in transmitting the packets (namely, the network delay; see https://en.wikipedia.org/wiki/Network_delay) from C to A is likely to be different from an OWD in transmitting the packets from C to B.

In operation, the monitoring entity 'A' (namely, the monitoring entity that co-resides with the communicating entity 'A') observes at a local time 't0(A)' that two packets are lost, because the communicating entity 'A' received packets having packet sequence numbers 'N', 'N+3', 'N+4'. The monitoring entity 'A' records this "packet-loss" event 'EA' in its observation report, and sends the observation report to a reporting entity 'R'. The observation report comprising information pertaining to the event 'EA' is received some time later at R, namely after an OWD from A to R, represented by 'OWD (A, R)'.

Meanwhile, in operation, the monitoring entity 'B' (namely, the monitoring entity that co-resides with the communicating entity 'B') observes at a local time 't0(B)' that two packets are lost, because the communicating entity 'B' received packets having packet sequence numbers 'K', 'K+3', 'K+4'. The monitoring entity 'B' records this "packet-loss" event 'EB' in its observation report, and sends the observation report to the reporting entity 'R'. The observation report comprising information pertaining to the event 'EB' is received some time later at R, namely after an OWD from B to R, represented by 'OWD (B, R)'.

It will be appreciated that the events 'EA' and 'EB' are observed independently by the monitoring entities 'A' and 'B', respectively. In operation, the reporting entity 'R' analyzes the observation reports received from A and B to determine a correlation between the events 'EA' and 'EB'. Based upon the correlation between the events 'EA' and 'EB', the reporting entity 'R' then identifies a problem encountered during the streaming media session, namely a root cause of the problem.

As an example, if both A and B lost the same two packets, the reporting entity 'R' determines that the root cause of the problem could be in a proximity of the conference bridge 'C'; whereas if A and B lost different packets, the reporting entity 'R' determines that the root cause of the problem could be in proximities of or with individual communicating entities 'A' and 'B'.

In the first example scenario, there will now be considered that the local time at the monitoring entities 'A' and 'B' and the reporting entity 'R' is not synchronized with the global time, namely local device clocks of A, B and R are not synchronized with a global clock. In such a case, even events observed and recorded contemporaneously at the monitoring entities 'A' and 'B' would carry different timestamps.

The events 'EA' and 'EB' may be observed and recorded at different absolute times on the global clock, due to different OWDs from the conference bridge 'C' to the communicating entities 'A' and 'B'. Moreover, the observation reports about the events 'EA' and 'EB' may arrive at the reporting entity 'R' at different absolute times on the global clock, due to at least one of:

different OWDs from the monitoring entities 'A' and 'B' to the reporting entity 'R', different delays in processing the observation reports at the monitoring entities 'A' and 'B' and/or the reporting entity 'R'.

Thus, in order to be able to determine the correlation between the events 'EA' and 'EB' recorded in the observation reports, the reporting entity 'R' optionally takes into consideration at least one of the aforementioned delays during the analysis of the observation reports.

For illustration purposes only, there will now be considered a second example scenario wherein communicating entities 'M' and 'N' are communicating directly during a streaming media session, and are configured to act as monitoring entities. One such example scenario has been illustrated in conjunction with FIG. 2B, for example as described below.

There is a One-Way Delay (OWD) from M to N, represented by 'OWD (M, N)'. Consequently, a transmission event observed at M at the global time 't1' would cause a reception event to be observed at N at the global time 't2' (=t1+OWD (M, N)). Notably, the one-way delay 'OWD (M, N)' is not constant, namely varies with time.

There will now be considered that both the monitoring entities 'M' and 'N' (namely, the monitoring entities co-residing with the communicating entity 'M' and 'N', respectively) report the events recorded thereat to a same reporting entity 'R'. In operation, the monitoring entity 'M' observes that a packet having a packet sequence number 'J' (or a frame number 'K') was sent from M to N at local time 't0(M)' (namely, according to a device clock of M), and reports this transmission event in its observation report to R. Likewise, the monitoring entity 'N' observes that the packet having the packet sequence number 'J' (or the frame number 'K') was received at N from M at local time 't0(N)' (namely, according to a device clock of N), and reports this reception event in its observation report to R. If the local time of the monitoring entities 'M' and 'N' were synchronized, t0(N)=t0(M)+OWD (M, N).

Moreover, the observation reports about the aforementioned transmission and reception events may arrive at R at different absolute times on the global clock, due to at least one of:

different OWDs from the monitoring entities 'M' and 'N' to the reporting entity 'R', different delays in processing the observation reports at the monitoring entities 'M' and 'N' and/or the reporting entity 'R'.

In order to be able to determine a correlation between the transmission and reception events of the same packet, the reporting entity 'R' optionally takes into consideration at least one of the aforementioned delays during the analysis of the observation reports.

In operation, the reporting entity 'R' analyzes the observation reports received from M and N to determine a correlation between the transmission and reception events observed at M and N, respectively. This enables the reporting entity 'R' to check whether or not a transmission progress of the communicating entity 'M' is aligned with a reception progress of the communicating entity 'N'. As an example, if the communicating entity 'M' has sent more packets than what the communicating entity 'N' has received, the reporting entity 'R' may determine that there is a queue build-up inside a data communication network being employed; accordingly, the reporting entity 'R' notifies at least one network entity and/or at least one of M and N to perform a remedial action to reduce the queue build-up. On the other hand, if the communicating entity 'N' has received all the packets sent by the communicating entity 'M', the reporting entity 'R' may determine that the queue has reduced inside the data communication network.

Moreover, an absolute value of the one-way delay 'OWD (M, N)' at a given instant of time can be used as an indicator of a level of interactivity between the communicating entities 'M' and 'N' during the streaming media session.

It will be appreciated that a similar analysis can be performed simultaneously for any two communicating entities during a given streaming media session, for example, such as between C and each of A and B of the first example scenario.

Pursuant to embodiments of the present disclosure, various mechanisms can be used, either alone or in combination, to determine the correlation between the events, for example, as explained below.

1. Time-Based Correlation Mechanism:

Optionally, in a given observation report, the information pertaining to the events is recorded as a function of local time at the corresponding monitoring entity.

Optionally, in operation, the at least one reporting entity determines which time windows in the plurality of observation reports match with each other.

In other words, if a time window is selected for one observation report dynamically, a different time window may be selected for another observation report.

Optionally, in this regard, timelines of different observation reports (collected from different monitoring entities) are time-shifted (for example, adjusted using offsets) with respect to each other.

As an example, if an upper bound of an OWD (or a Round-Trip Delay (RTD)) between two monitoring entities is 2 seconds, a first offset can be determined as +/−2 seconds; if a difference between OWDs (or RTDs) between each of the two monitoring entities and a reporting entity is 1 second, a second offset can be determined as +/−1 second. In such a case, if an event is recorded at time 't0' (in seconds) on a local timeline of a first monitoring entity, then a time window falling into a time interval [t0−3; t0+3] on a local timeline of a second monitoring entity would be searched for similar events.

Moreover, according to an embodiment, in a given observation report, the events are recorded on a local timeline of the corresponding monitoring entity. Optionally, in this regard, the step of analyzing the plurality of observation reports comprises adjusting, in the plurality of observation reports, local timelines of the plurality of monitoring entities with respect to a local clock of the at least one reporting entity.

As an example, the timelines of the observation reports may be adjusted using one or more offsets that are based on OWDs and/or RTDs between the monitoring entities and the at least one reporting entity.

2. Marker-Based Correlation Mechanism:

Additionally or alternatively, optionally, in a given observation report, the information pertaining to the events is recorded as a function of a marker (for example, such as packet sequence numbers, frame numbers, vector clock timestamps and the like) at the corresponding monitoring entity. Such markers are typically assigned by a given transmitting entity to each packet originating therefrom, when the given transmitting entity packetizes data prior to transmitting packets to a given receiving entity. Such markers could be negotiated and/or initialized during an initial set-up process in which the at least one streaming media session is created.

Optionally, in such a case, different events recorded at different monitoring entities for a given packet are correlated by a marker that is assigned to the given packet.

As an example, in the Real-time Transport Protocol (RTP), packets are assigned packet sequence numbers in a strictly monotonically-increasing manner. Optionally, in such a case, the step of analyzing the plurality of observation reports comprises marking the events onto a local marker-line associated with a given transmitting entity from which packets originated, namely by marking the events onto a series of packet sequence numbers assigned by the given transmitting entity.

Additionally or alternatively, optionally, the step of analyzing the plurality of observation reports comprises marking the events onto a common marker-line. Optionally, for this purpose, the plurality of communicating entities send, to each other, status reports (for example, such as RTP Control Protocol (RTCP) reports, when using the RTP) that include their respective highest packet sequence numbers that have been sent as well as their respective highest packet sequence numbers that have been received. Optionally, in such a case, the at least one reporting entity is configured to correlate the packet sequence numbers that have been used in both directions within bounds of a Round-Trip Delay (RTD) between the plurality of communicating entities, and to establish the common marker-line for the plurality of communicating entities.

3. Event-Based Correlation Mechanism:

Additionally, optionally, the at least one reporting entity is configured to correlate events of a similar type, based upon a predefined similarity threshold. Optionally, in this regard, a plurality of event types and their associated metrics are defined and employed for classifying events. Optionally, a given event type is associated with at least one of: network or transport layer metrics, application-specific metrics, media-related metrics, Quality-of-Experience (QoE) metrics. Some examples of the event types are packet loss, burst loss, audio interruption and video impairment.

It will be appreciated that different events observed at different monitoring entities can have substantially similar or different data values of metrics associated with a given event type. In other words, events may be of a similar type, but may have different absolute or relative data values of said metrics.

As an example, two monitoring entities may record packet-loss events involving a loss of 10 packets and two packets, respectively. As another example, two monitoring entities may record packet-loss events involving a loss of five packets each. As yet another example, a first monitoring entity could record an event that there was no packet loss in a given media stream, while a second monitoring entity and a third monitoring entity could record events that there was a 5% packet loss and an 8% packet loss, respectively, in the given media stream.

Optionally, in this regard, if a given event (for example, a packet loss of 'k' packets) is detected in one observation report, it is checked whether or not an event of a similar type (for example, a packet loss of 'k+/−2' packets) is recorded in another observation report. If it is found that an event of a similar type is recorded, and if other correlation mechanisms (for example, the aforesaid time-based correlation and/or the aforementioned marker-based correlation) suggest at least an approximate correlation between these events (for example, if the events were recorded within time T across a common timeline), the events are correlated to each other and inferences are drawn from said correlation.

As an example, in case of packet-loss events, such correlation may suggest that the packet losses observed at two receiving entities occurred rather closer to a transmitting entity; this, in turn, might suggest a temporary capacity bottleneck, thereby allowing a corrective action, for example such as re-routing, to be taken whilst the at least one streaming media session is still on-going.

It will be appreciated that even such approximate correlation is beneficial for narrowing down a search space for correlating the events. Such approximate correlation is also beneficial to limit an amount of historical observation reports that are required to be stored and/or analyzed for correlation. This reduces the memory usage of the at least one reporting entity performing the aforesaid analysis.

4. Semantics-Based Correlation Mechanism:

Optionally, events of related types are correlated semantically. Such correlation is performed by making semantic observations regarding the events of related types.

Optionally, in this regard, for a given event type, one or more other event types that are related to the given event type are defined. More optionally, the given event type and the one or more other event types are classified under a same category. It will be appreciated that various event types and categories under which they are classified can have a many-to-many relationship.

As an example, a first monitoring entity and a second monitoring entity may observe a video-impairment event at a first receiving entity and an audio-interruption event at a second receiving entity, respectively, due to a short-term network disruption. In this example, the first monitoring entity may observe packet-loss events of two, three and three packets at time 't1', 't2' and 't3', respectively, while the second monitoring entity may observe packet-loss events of one, three and two packets at time 't4', 't5' and 't6', respectively; the time 't4', 't5' and 't6' are within a certain delta time from the time 't1', 't2' and 't3', respectively. It will be appreciated that even though the packet-loss events leading to the aforesaid video-impairment event and the aforesaid audio-interruption event may not be similar, these packet-loss events could be correlated semantically to determine a root cause of the problem, namely the short-term network disruption.

Moreover, optionally, the step of analyzing the plurality of observation reports comprises detecting a correlation between a first anomalous event and a second anomalous event belonging to a same category when the first anomalous event and the second anomalous event occur within the at least one window, the first anomalous event and the second anomalous event being detected, respectively, for a first observation report and a second observation report from amongst the plurality of observation reports. It will be appreciated that the first observation report and the second observation report are collected, respectively, from a first monitoring entity and a second monitoring entity from amongst the plurality of monitoring entities.

Hereinabove, by "same category", it is meant that the first anomalous event and the second anomalous event are of related types, whist differing in metrics associated with their respective event types, and represent similar semantics observations. It will be appreciated that events belonging to a same category are optionally correlated semantically, namely using the aforesaid semantics-based correlation mechanism.

As an example, in a three-party conference, if two out of three communicating entities share a lossy network link on their access network, anomalous events will be detected for both the communicating entities. By correlating their anomalous events semantically (for example, leading to a stalled or impaired video), it would be possible to determine that these communicating entities share a common lossy network link (for example, even if precise observations of their associated metrics, for example, packet losses, differ). Accordingly, a suitable corrective action, for example such as re-routing, would be performed.

Optionally, the method further comprises defining a plurality of categories of events. Optionally, in this regard, a given category is defined by a set of parameters that are required to be checked to classify a given event into the given category. Some example categories for classifying the events are packet-loss events, burst-loss events, jitter events, latency events, media-repair events, post-repair loss events, packets-discarded events, media quality-related events, media stall or gap events and so on.

Moreover, it will be appreciated that the first anomalous event and the second anomalous event are said to occur within the at least one window, when a distance between occurrences of the first anomalous event and the second anomalous event is smaller than the size of the at least one window. Depending upon a type of the at least one window, the distance can be measured as any one of: a time duration, a count of consecutive packet sequence numbers, a count of consecutive frame numbers, a count of consecutive timestamps, a series or count of events, a series or count of semantic observations.

Optionally, when the at least one window is at least one time window, an initial size of the at least one window is determined as any one of:

a first OWD or RTD between a transmitting entity and a receiving entity (namely, end-points) identified in the first observation report and the second observation report, a second OWD or RTD between the transmitting entity and its corresponding monitoring entity, a third OWD or RTD between the receiving entity and its corresponding monitoring entity, a fourth OWD or RTD between the first monitoring entity and the second monitoring entity, a fifth OWD or RTD between the first monitoring entity and the at least one reporting entity, a sixth OWD or RTD between the second monitoring entity and the at least one reporting entity, a sum of two or more of: the first OWD or RTD, the second OWD or RTD, the third OWD or RTD, the fourth OWD or RTD, the fifth OWD or RTD, the sixth OWD or RTD.

Moreover, optionally, the size of the at least one window is determined dynamically, based upon the category to which the first anomalous event and the second anomalous event belong. As an example, an extended sequence of lost packets, namely a burst-loss event, may only be reported at an end of the sequence and initial observations of the burst-loss event may be made and recorded at different monitoring entities at different points in time. In such a case, the size of the at least one window is adjusted to accommodate a larger distance between the initial observations recorded at the different monitoring entities. As another example, individual packet losses, namely packet-loss events, may often occur independently. In such a case, the size of the at least one window is adjusted to accommodate a smaller distance between observations recorded at different monitoring entities.

Pursuant to an embodiment of the present disclosure, the size of the at least one window is adjusted without impacting statistical properties of the events observed and recorded by the plurality of monitoring entities. This is particularly beneficial, as the plurality of observation reports are typically collected from the plurality of monitoring entities at different times.

Moreover, it will be appreciated that it is important to determine a strength of a certainty with which a root cause of the problem has been identified based on the correlation of the events. Optionally, the strength is determined as a function of a type of a corrective action to be taken to solve the problem. In other words, easy-to-take actions that would not cause any harm (for example, such as an overhead) may be generated upon weaker suspicions, whereas stronger actions (for example, such as alerting a network operator about a serious network problem) may be generated upon a strong confirmation. It will be appreciated that irrespective of the type of the corrective action, a certain number of anomalous events are required to confirm a given correlation, so as to avoid acting upon mere coincidence.

Furthermore, optionally, for the given observation report, the information pertaining to the events comprises data values of a plurality of metrics as recorded at the corresponding monitoring entity. Optionally, the plurality of metrics include at least one of: RTDs between a given monitoring entity and the at least one reporting entity, RTDs between the given monitoring entity and a given communicating entity that is being monitored by the given monitoring entity, RTDs between the communicating entities, jitter, throughput, goodput, Quality-of-Service (QoS), a number of packets that are lost or discarded, loss rate, transmission rate, metrics related to media quality or media Quality-of-Experience (QoE).

Optionally, the at least one window comprises at least a first window and a second window, the first window being shorter than the second window, wherein the step of analyzing the plurality of observation reports comprises:
 employing a statistical inference technique to check whether or not a first distribution of data values of at least one of the plurality of metrics in the first window is different from a second distribution of the data values of the at least one of the plurality of metrics in the second window and to determine a score indicative of an extent of difference between the first distribution and the second distribution; and
 detecting a presence of an anomalous event when the score is greater than or equal to a predefined threshold score.

Optionally, the statistical inference technique is a t-test. It will be appreciated that t-tests are well known in the art.

In case of a t-test, the minimum number of events beneficially lies within a range of 5 events to 30 events. It will be appreciated that the aforesaid range is merely an example; various ranges may be chosen differently in different scenarios.

Optionally, sizes of the first window and the second window are initially set to default values. Optionally, the sizes of the first window and the second window are adjusted iteratively based upon the determined score. As an example, if the score is lesser than the predefined threshold score merely marginally, the sizes of the first window and the second window may be adjusted to detect a presence of any potential anomalous event.

As an example, a rule may be defined that a presence of an anomalous event is detected when a score for an anomalous RTD is greater than or equal to 95 percent. As another example, another rule may be defined that a presence of an anomalous event is detected when an RTD and a throughput are in an anomalous state with a score greater than or equal to 90 percent. In such a case, the problem may be identified as network congestion.

Moreover, optionally, the step of analyzing the plurality of observation reports comprises:
 storing historical data values of the plurality of metrics as recorded in a plurality of historical observation reports;
 calculating from the historical data values a multivariate normal distribution across the plurality of metrics;
 calculating, for a given event recorded in the given observation report, a probability of occurrence of the given event provided the multivariate normal distribution; and
 detecting the given event as an anomalous event when the calculated probability is lower than a predefined threshold probability.

It will be appreciated that the multivariate normal distribution can be calculated across all the metrics if a large amount of historical data values is available. As an example, such a large amount of historical data values may be available for a period of last 1 hour, last 3 hours, last 6 hours, last 12 hours, last 24 hours, last three days, last week, last 15 days, last month, last two months, last three months or so on. In such a case, it is assumed that such a large amount of historical data values holds insights about a normal operational state of a data communication network.

Optionally, in such a case, the step of identifying the problem comprises:
 calculating a conditional probability for a given metric from amongst the plurality of metrics provided a set of data values of other metrics from amongst the plurality of metrics; and
 detecting the given metric as an anomalous metric when the calculated conditional probability is lower than a predefined threshold conditional probability.

In this way, the multivariate normal distribution can be mapped to multiple dimensions to detect one or more metrics that are anomalous. It will be appreciated that the calculation of the conditional probability is a closed-form solution that is typically achieved in real-time.

Furthermore, optionally, the step of determining the size of the at least one window and the step of analyzing the plurality of observation reports are performed recursively.

Optionally, in this regard, the size of the at least one window is determined dynamically, based upon the correlation between the events. As an example, if a notable correlation between the events is detected, the size of the at least one window can be reduced to perform the analysis more frequently and/or at a finer granularity. As another example, if no useful correlation between the events is detected, the size of the at least one window can be increased to perform the analysis less frequently.

Optionally, the method further comprises:
analyzing at least one of the plurality of observation reports to detect an occurrence of at least one initial event during the at least one streaming media session; and
triggering, based upon the at least one initial event, the at least one reporting entity to perform the step of determining the size of the at least one window.

Optionally, in this regard, the step of analyzing the plurality of observation reports comprises detecting, in at least one other of the plurality of observation reports, at least one correlated event in future or past with respect to the at least one initial event. The at least one other of the plurality of observation reports is different from the at least one of the plurality of observation reports.

For illustration purposes only, there will now be considered an example scenario wherein a given window is used for correlating events across a plurality of observation reports. One such example has been illustrated in conjunction with FIG. 5 as explained in more detail below.

Considering that a reporting entity (whereat these observation reports are collected) analyzes at least one of the observation reports, and detects an occurrence of an initial event during the steaming media session. The detection of the initial event in the at least one of the observation reports triggers the reporting entity to analyze all the observation reports in which events occurring during the streaming media session are recorded. For this purpose, the reporting entity determines a size of the given window to be used for analyzing the observation reports. The reporting entity may determine the size of the given window recursively, by analyzing remaining observation reports with respect to the at least one of the observation reports for detecting correlated events in future or past with respect to the given event.

Furthermore, according to an embodiment, the plurality of observation reports are analyzed with respect to:
a monitoring entity that is a communicating entity transmitting packets to one or more other communicating entities during the at least one streaming media session, or
a monitoring entity that is nearest to the communicating entity transmitting the packets.

For illustration purposes only, there will now be considered a third example scenario (continuing from the aforementioned second example scenario) wherein both of the communicating entities 'M' and 'N' are exchanging packets during the streaming media session, and are configured to act as monitoring entities. One such example scenario has been illustrated in conjunction with FIG. 2C, for example as described below.

Similar to the One-Way Delay (OWD) from M to N (represented by 'OWD (M, N)'), there is an OWD from N to M, represented by 'OWD (N, M)'. Consequently, a transmission event observed at N at the global time 't3' would cause a reception event to be observed at M at the global time 't4' (=t3+OWD (N, M)). Notably, the one-way delays 'OWD (M, N)' and 'OWD (N, M)' are not constant, namely vary with time.

In the third example scenario, there will now be considered that the local time at the monitoring entities 'M' and 'N' and the reporting entity 'R' are not synchronized with the global time, namely local device clocks of M, N and R are not synchronized with a global clock. In such a case, even events observed and recorded contemporaneously at the monitoring entities 'M' and 'N' would carry different timestamps. To add to this, with different OWDs in the opposite directions, it is difficult to reconstruct which events occurred at both the communicating entities 'M' and 'N' at any given point in time. As a result, there is no common reference point in time for correlating the events across the different observation reports. Thus, an appropriate report-collection interval (namely, for collecting and analyzing the observation reports at the reporting entity 'R') is not obvious.

Therefore, the reporting entity 'R' optionally analyzes the observation reports with respect to each transmitting entity. This enables the reporting entity 'R' to correlate transmission and reception events associated with packets originating from that transmitting entity.

Moreover, in operation, the reporting entity 'R' optionally employs a common timeline (namely, a neutral time axis) for correlating transmission events of M to reception events of N and those in the opposite direction. This enables the reporting entity 'R' to reconstruct which events occurred at both the communicating entities 'M' and 'N' at any given point in time. This is particularly beneficial for determining whether or not some events were invoked independently at M and N at the same time.

It will be appreciated that a similar analysis can be performed simultaneously for any two communicating entities during a given streaming media session, for example, such as between C and each of A and B of the first example scenario.

It will be appreciated that the aforementioned example scenarios are for illustration purposes only. A person skilled in the art will recognize many variations, alternatives, and modifications of these example scenarios. For example, there can be more than two communicating entities communicating with each other during a given streaming media session. Moreover, apart from or instead of the communicating entities, one or more network entities forwarding packets between the communicating entities can be configured to act as monitoring entities.

Moreover, according to an embodiment, the plurality of observation reports are analyzed for at least one of:
per media stream communicated during a given streaming media session,
per streaming media session across at least a subset of media streams communicated during a given streaming media session,
per media type within a given streaming media session or across a plurality of streaming media sessions,
across a plurality of streaming media sessions.

Optionally, the at least one streaming media session comprises a plurality of streaming media sessions, wherein the method comprises selecting the plurality of streaming media sessions across which the plurality of observation reports are to be analyzed, the plurality of streaming media sessions being selected using an aggregation scheme.

Optionally, in this regard, the aggregation scheme is based upon at least one device property and/or at least one environmental property observed for at least one of the plurality of communicating entities. Examples of such device properties and environmental properties have been provided later.

It will be appreciated that correlating the events across the plurality of streaming media sessions is not easy, because observation reports comprising information pertaining to events (associated with the plurality of streaming media sessions) may be collected at different reporting entities. Optionally, in such a case, "remote matching" mechanisms are utilized to determine the reporting entities to which these observation reports have been delivered. Such "remote matching" mechanisms involve an active exchange of information about the plurality of streaming media sessions across which the events are to be correlated.

Furthermore, optionally, the at least one reporting entity comprises a single reporting entity at which the plurality of observation reports are analyzed in a centralized manner.

Alternatively, optionally, the at least one reporting entity comprises a plurality of reporting entities, wherein the method comprises:
- determining the plurality of reporting entities at which the plurality of observation reports are being collected; and
- exchanging, between the plurality of reporting entities, information indicative of one or more types of events that are to be correlated.

Optionally, in such a case, the plurality of observation reports are analyzed in a decentralized manner (namely, in a distributed manner).

Optionally, the plurality of reporting entities are predetermined. Alternatively, optionally, the plurality of reporting entities are elected dynamically.

Optionally, the events are correlated in a structured manner (for example, in a hierarchical manner). Optionally, in this regard, at least one of the plurality of reporting entities is configured to analyze the plurality of observation reports to correlate the events pertaining to a subset of calls or a subset of communicating entities.

Additionally, optionally, the at least one of the plurality of reporting entities is configured to generate summary information based upon the aforesaid analysis, and to deliver the summary information to at least one other of the plurality of reporting entities, thereby enabling the at least one other of the plurality of reporting entities to determine the correlation between the events. Optionally, in such a case, the summary information is generated in a dynamically-adapting manner, for example, based upon the correlation determined between the events.

Thus, the events are correlated in an overlapping manner or a mutually-exclusive manner.

Window Size:

The at least one window is employed to confine a search space for correlating the events across the plurality of observation reports. Without the at least one window, the at least one reporting entity would need to search from a beginning of the at least one streaming media session to a current instant of time 't_current', namely in a time interval [0, t_current]. This time interval grows in size while the at least one streaming media session is on-going; consequently, a large amount of computing resources would be required to analyze the plurality of observation reports. In order to limit the amount of computing resources required and to improve timeliness of correlating the events and taking corresponding corrective actions in an efficient manner (which, in turn, contribute to improving the quality and performance of the at least one streaming media session), the size of the at least one window is required to be determined appropriately. As an example, the search space for correlating the events can be limited by employing a smaller time window [t_x, t_current]. Pursuant to embodiments of the present disclosure, the size of the at least one window is determined dynamically, such that the size of the at least one window (for example, the time interval t_current−t_x) is as small as possible to limit the amount of computing resources required, but is as large as possible to determine the correlation between the events.

It will be appreciated that the at least one window can be defined using time and/or another suitable marker.

According to an embodiment, the size of the at least one window is determined as at least one of: a given time duration, a given count of consecutive packet sequence numbers, a given count of consecutive frame numbers, a given count of consecutive timestamps, a given series or count of events, a given series or count of semantic observations.

As an example, the size of the at least one window can be determined as a given time duration, when the information pertaining to the events is recorded as a function of time. It will be appreciated that the given time duration may be determined as 10 milliseconds, 100 milliseconds, 1 second, 5 seconds, 10 seconds and so on.

As another example, the size of the at least one window can be determined as a given count of consecutive timestamps, when the information pertaining to the events is recorded as a function of media-related timestamps; such media-related timestamps are assigned by a given transmitting entity to each packet originating therefrom. It will be appreciated that the given count of consecutive timestamps may be determined as 20 consecutive timestamps, 100 consecutive timestamps, 200 consecutive timestamps, 500 consecutive timestamps, 1000 consecutive timestamps, and so on.

As yet another example, the size of the at least one window can be determined as a given count of consecutive packet sequence numbers, when the information pertaining to the events is recorded as a function of packet sequence numbers; such packet sequence numbers are assigned by a given transmitting entity to each packet originating therefrom. It will be appreciated that the given count of consecutive packet sequence numbers may be determined as 20 consecutive packet sequence numbers, 100 consecutive packet sequence numbers, 200 consecutive packet sequence numbers, 500 consecutive packet sequence numbers, 1000 consecutive packet sequence numbers, and so on.

Optionally, the at least one window is a sliding window. Alternatively, optionally, the at least one window is a partly-overlapping jumping window or a non-overlapping jumping window. In case of a non-overlapping window, there may or may not be gaps in-between adjacent windows.

Optionally, at least a part of information available in one window is carried over to another window. Optionally, in this regard, the part of the information is stored on a temporary basis. In such a case, the size of the at least one window can be reduced.

According to one embodiment, the at least one window comprises at least one time window, wherein the size of the at least one window (namely, a given time duration of the at least one time window) is determined based upon at least one of:
- Round-Trip Delays (RTDs) between the plurality of monitoring entities,
- One-Way Delays (OWDs) between the plurality of monitoring entities in opposite directions,
- RTDs from individual monitoring entities to the at least one reporting entity,
- OWDs from the individual monitoring entities to the at least one reporting entity,
- delays in processing the plurality of observation reports at corresponding monitoring entities and/or at the at least one reporting entity,
- waiting time for which the at least one reporting entity waited to collect the plurality of observation reports from the plurality of monitoring entities.

The RTDs between the plurality of monitoring entities can be measured by the monitoring entities themselves, when the monitoring entities are the communicating entities. The RTDs between the individual monitoring entities and the at least one reporting entity can be measured by the at least one reporting entity.

Optionally, an RTD of a signalling path between two communicating entities is utilized to obtain a first order-of-magnitude RTD measurement to determine the size of the at least one window. In such a case, the RTD of the signalling path can be used to limit the search space for correlating the events, starting with an exchange of a first media packet between the communicating entities. As the signalling path is slower than a direct connection between the communicating entities, the RTD of the signalling path can be utilized as an upper bound for the RTD of media traffic between the communicating entities.

Optionally, an RTD of NAT probing packets (for example, as used during Interactive Connectivity Establishment (ICE) signalling) between two communicating entities is utilized to obtain an initial RTD measurement to determine the size of the at least one window. It will be appreciated that the NAT probing packets travel directly between the two communicating entities, and therefore, should not be used as an upper bound for the RTD of the media traffic.

The aforementioned Round-Trip Delays (RTDs) and One-Way Delays (OWDs) are time-varying (namely, keep varying with time), and therefore, are required to be measured from time-to-time. Optionally, the RTDs and/or the OWDs between any two entities are measured periodically.

One-way delays (OWDs) between any two entities can be different in opposite directions (namely, upstream and downstream directions with respect to a given communicating entity).

Additionally, optionally, the given time duration of the at least one time window is determined based upon a type of the data communication network between the plurality of communicating entities. As an example, different time windows can be used depending upon whether a mobile network or a fixed-line network is used.

For illustration purposes only, there will now be considered an example scenario wherein communicating entities 'A' and 'B' create a streaming media session for communicating with each, and are configured to act as monitoring entities. One such example has been illustrated in conjunction with FIG. 3 as explained in more detail below.

Signalling usually happens via intermediaries, for example, such as web servers and Web Real-Time Communication (WebRTC) servers. There will now be considered that signalling servers 'SA' and 'SB' are employed to set up a connection between A and B. In other words, the communicating entities 'A' and 'B' exchange signals with each other over a signalling channel provided via their corresponding servers 'SA' and 'SB', respectively. Thus, a signalling path from A to B would include paths from A to SA, from SA to SB and from SB to B. Likewise, a signalling path from B to A would include paths from B to SB, from SB to SA and from SA to A. The signalling path from A to B has a one-way delay 'OWD-S (A, B)', whereas the signalling path from B to A has a one-way delay 'OWD-S (B, A)'.

Typically, a concatenation of these signalling paths is slower as compared to the direct connection between A and B. In other words, OWD-S (A, B) is greater than OWD (A, B), namely an OWD of media traffic from A to B; OWD-S (B, A) is greater than OWD (B, A), namely an OWD of media traffic from B to A. Therefore, the OWDs of the signalling paths can be utilized as an upper bound for the OWDs of the media traffic.

Moreover, there will now be considered that A and B deliver their observation reports to different reporting entities 'RA' and 'RB', respectively. The monitoring entities A and B take some time to deliver these observation reports, for example due to a delay in processing the observation reports thereat. Additionally, the observation report delivered by A arrives at RA after a one-way delay from A to RA 'OWD-R (A, RA)', whereas the observation report delivered by B arrives at RB after a one-way delay from B to RB 'OWD-R (B, RB)'.

It will be appreciated that the aforementioned example scenario is for illustration purposes only. A person skilled in the art will recognize many variations, alternatives, and modifications of these example scenarios. For example, there can be more than two servers and reporting entities, or just one server and reporting entity.

For illustration purposes only, there will now be considered another example scenario wherein apart from or instead of the communicating entities 'A' and 'B', network entities 'NA' and 'NB' are configured to act as monitoring entities. One such example has been illustrated in conjunction with FIG. 4 as explained in more detail below.

One-Way Delays (OWDs) and Round-Trip Delays (RTDs) between the network entities 'NA' and 'NB' is smaller than the OWDs and RTDs between the communicating entities 'A' and 'B', respectively. Therefore, the OWDs and RTDs between A and B can be utilized as an upper bound of the OWDs and RTDs between NA and NB, because the network entities 'NA' and 'NB' cannot measure the OWDs and RTDs easily.

In this regard, the communicating entities 'A' and 'B' measure their OWDs and RTDs, and are optionally configured to provide these OWDs and RTDs to the reporting entities 'RA' and 'RB', respectively. The reporting entities 'RA' and 'RB' then utilize these OWDs and RTDs for analyzing observation reports collected from network entities 'NA' and 'NB', in order to be able to determine a correlation between events observed at NA and NB.

Observing and Recording Events:

Optionally, a given monitoring entity is configured to record performance-specific observations pertaining to at least one of:

- a device associated with at least one of the plurality of communicating entities,
- a communication client being employed for the at least one streaming media session by the at least one of the plurality of communicating entities,
- packets being communicated between the plurality of communicating entities during the at least one streaming media session,
- at least one media stream comprising the packets,
- an access network being employed for the at least one streaming media session by the at least one of the plurality of communicating entities.

Optionally, in order to observe and record the events, the given monitoring entity is configured to process its own performance-specific observations to generate the information pertaining to the events.

Additionally or alternatively, optionally, a given observation report further comprises information pertaining to the performance-specific observations recorded at the corresponding monitoring entity. Optionally, in such a case, a given observation report comprises complete or partial data of the performance-specific observations, raw or processed data of the performance-specific observations, or any combination thereof.

Moreover, optionally, the method further comprises:
receiving, from the at least one of the plurality of communicating entities, session parameters associated with the at least one streaming media session, wherein the session parameters uniquely identify the at least one streaming media session; and
using the session parameters to identify the packets being communicated during the at least one streaming media session.

Optionally, in this regard, the at least one of the plurality of communicating entities is configured to send the session parameters to the at least one reporting entity when the at least one streaming media session is setup. Optionally, the at least one of the plurality of communicating entities are configured by way of at least one of:
software libraries that are integrated in the device associated with the at least one of the plurality of communicating entities,
software plugins or extensions that are installed at the device to extend the functionality of existing browser applications,
stand-alone software applications that are installed at the device,
firmware integration.

Optionally, the at least one network entity is configured by way of at least one of:
software libraries that are integrated in network devices associated with the at least one network entity,
stand-alone software applications that are installed at the network devices,
firmware integration.

Moreover, it will be appreciated that at the at least one network entity, a given packet is optionally identified by a quintuple comprising an Internet Protocol (IP) address of a source of the given packet, an IP address of a destination of the given packet, a source port number, a destination port number, and a transport protocol. For multimedia, the transport protocol is usually, but not necessarily, the User Datagram Protocol (UDP). Optionally, apart from the quintuple, the given packet further comprises a flow label or other identifiers to signify quality of service demands, for example, a differentiated services code point. Additionally, optionally, the given packet is further distinguished by its payload type or a unique identifier of its source. Moreover, optionally, the given packet carries a connection identifier. Notably, at the at least one of the plurality of communicating entities, the identification of the given packet is simple, as a software application responsible for sourcing and sinking packets is assumed to use defined functions.

Optionally, the session parameters associated with the at least one streaming media session comprise at least one of:
a unique identifier assigned to a software application being used to employ the communication client for the at least one streaming media session (hereinafter referred to as the "AppID" for the sake of convenience only; the AppID represents a unique service deployment, for example, such as Skype®, Google® Hangout, and similar)
an identifier of a conference to which the at least one streaming media session belongs (hereinafter referred to as the "conferenceID" for the sake of convenience only),
an identifier of the at least one streaming media session (hereinafter referred to as the "sessionID" for the sake of convenience only),
a unique identifier of a user involved in the at least one streaming media session (hereinafter referred to as the "userID" for the sake of convenience only),
an identifier of an endpoint, for example such as a device or a browser, being used for the at least one streaming media session (hereinafter referred to as the "endpointID" for the sake of convenience only), an identifier of a connection pair, namely a pair of communicating entities connected, for example via a fabric (hereinafter referred to as the "pairID" for the sake of convenience only), a unique identifier of a source of the at least one media stream (hereinafter referred to as the "sourceID" for the sake of convenience only).

In some implementations, all participants in the conference, namely all of the plurality of communicating entities, are assigned the same conferenceID; in such a case, the conferenceID is unique. In other implementations, the conferenceID is not unique, and therefore, sessionIDs are used; in such a case, each participant in the conference has a different sessionID. Beneficially, for a given participant, the sessionID changes when the given participant leaves and re-joins the conference.

It will be appreciated that the endpointID is specific to a device or a browser being used for the at least one streaming media session. As an example, if a given user has multiple devices and/or browsers, these devices and/or browsers will have different endpointIDs for the same userID.

Optionally, the sourceID is a Synchronization Source identifier (SSRC identifier; see RFC3550) that uniquely identifies the source of the at least one media stream. In the Real-time Transport Protocol (RTP), SSRCs within a same streaming media session are unique.

Optionally, SSRCs are exchanged between the plurality of communicating entities during the setup of the at least one streaming media session. As an example, during the setup of the at least one streaming media session, the Session Description Protocol (SDP) can be used by endpoints associated with the plurality of communicating entities to describe the at least one streaming media session for purposes of session announcement, session invitation and negotiating parameters such as a media type, a media format and so forth.

More optionally, the session parameters associated with the at least one streaming media session comprises the AppID, the SSRC and the conferenceID. Alternatively, optionally, the session parameters associated with the at least one streaming media session comprises the AppID, the SSRC and the userID.

Optionally, the session parameters associated with the at least one streaming media session are received from at least one transmitting entity and at least one receiving entity from amongst the plurality of communicating entities.

In some implementations, the plurality of communicating entities comprise a plurality of transmitting entities and a plurality of receiving entities. As an example, in a video conferencing session, the plurality of communicating entities could comprise a group of user entities that may act as both transmitting entities as well as receiving entities.

In other implementations, the plurality of communicating entities comprise a single transmitting entity and a plurality of receiving entities. As an example, in a webcast session, the plurality of communicating entities could comprise a single media server, namely an automated entity, and thousands of simultaneous listeners/viewers, namely user entities.

Moreover, according to an embodiment, the performance-specific observations comprise at least one of:

at least one packet arrival characteristic observed for the at least one media stream and/or the packets, at least one packet propagation characteristic observed for the at least one media stream and/or the packets, at least one media rendering characteristic observed for the at least one of the plurality of communicating entities during rendering of the at least one media stream, at least one transport address characteristic observed for the at least one of the plurality of communicating entities, at least one device property observed for the at least one of the plurality of communicating entities, at least one environmental property observed for the at least one of the plurality of communicating entities.

Optionally, the at least one packet arrival characteristic observed for the at least one media stream and/or the packets comprises at least one of:

the number of packets that are lost or discarded during communication, distribution of individual and/or burst losses or discards of packets as a function of time or as a function of another marker, a length of burst losses or discards, packets arrived at a given communicating entity and their associated timestamps or markers, duplicate packets arrived at a given communicating entity and their associated timestamps or markers, reordered packets.

It will be appreciated that observing the at least one packet arrival characteristic for non-media packets enables determining session quality in an extreme case, wherein non-connectivity between the plurality of communicating entities yields very poor quality of experience.

Optionally, the at least one packet propagation characteristic observed for the at least one media stream and/or the packets comprises latency observed from contents of packets. As an example, the latency may be observed from one or more bits keeping and/or changing their state of a given series of packets according to rules implemented by the communicating entities. As another example, the latency may be observed from a pair of a packet sequence number and an acknowledgement number.

Optionally, the at least one media rendering characteristic observed for the at least one of the plurality of communicating entities during the rendering of the at least one media stream comprises at least one of:

stalls in rendering, buffer overruns or underruns, a time-bound quality metric (for example, such as a playout delay and variation thereof), a percentage of frames generated or rendered in time, an Audio/Video (NV) sync, a media quality metric (for example, such as Peak-Signal-to-Noise-Ratio (PSNR) and Structural Similarity (SSIM) for video; the E model for audio; Mean-Opinion Score (MOS) and a selected media encoding and its parameters for any type of media), a variation or skewness in other quality metrics (for example, such as a frame rate, a frame size, a packetization interval, and so forth).

Optionally, the at least one transport address characteristic observed for the at least one of the plurality of communicating entities comprises at least one of:

network interfaces available, a given network interface in use, a change in the given network interface, handovers between different network interfaces, failed handovers, disruptions in network connectivity, connectivity losses, Interactive Connectivity Establishment (ICE) candidates.

It will be appreciated that communicating entities may have multiple addresses, for example, including direct, indirect and translated addresses. Optionally, before commencing the at least one streaming media session, the plurality of communicating entities exchange probing packets to determine addresses on which they can reach each other. For illustration purposes only, there will now be considered an example wherein a communicating entity 'A' has three addresses 'A1', 'A2', 'A3' and a communicating entity 'B' has two addresses 'B1' and 'B2'. A and B exchange probing packets to determine addresses on which they can reach each other. For this purpose, A sends probing packets from its addresses A1, A2, A3 to the addresses B1 and B2 of B; B sends a response for each probing packet that it receives. When a given response is received at A, A knows that it can use the address from which it received the given response for subsequent communication. Likewise, B sends probing packets from its addresses B1 and B2 to the addresses A1, A2 and A3 of A, and determines which addresses to use for subsequent communication based upon one or more responses it receives.

Optionally, the at least one device property observed for the at least one of the plurality of communicating entities comprises at least one of:

energy consumption of the device associated with the at least one of the plurality of communicating entities, a geographical location (namely, Geo location) of the device, for example, as determined based upon the IP address of the device (for example, geoIP), a device type of the device, an Operating System (OS) running on the device, a version of the software application being used to employ the communication client for the at least one streaming media session, a status of the software application (namely, whether the software application is in production or in testing), a service provider of the communication client, whether or not the communication client has sufficient processing power available, whether or not the communication client has sufficient network bandwidth available, battery power, usage of computational resources (for example, such as Central Processing Unit (CPU) usage, memory usage, and so forth), computational load (for example, such as CPU load, memory load, and so forth), measured properties of the access network (for example, such as ping latency, available bandwidth, dropped packets and so on), a communication load on the access network (for example, measured by the number of other users connected to the same access network), whether the access network is private or public, other software applications active at a given instant of time, a type of the access network (for example, such as fixed vs. mobile, wired vs. wireless, cellular vs. Wireless Local Area Network (WLAN), and so forth), a network type of a wireless network being used (for example, such as a 4G telecommunications network, a 5G telecommunications network, and so forth), a signal to noise ratio (SNR) of the wireless network,
a signal strength of the wireless network.

Optionally, the at least one environmental property observed for the at least one of the plurality of communicating entities comprises at least one of:
a civic location of a user using the device associated with the at least one of the plurality of communicating entities (for example, such as inside or outside a building, in a vehicle, and so forth),
a location of a user with reference to a local or global positioning system (for example, the Global Positioning System (GPS)),
a velocity of the user,
a type of movement of the user (for example, such as walking, driving, on a train, in a bus, on a bicycle, and so forth),
a context of an environment in which the user is present (for example, such as a density of people around, an ambient temperature, weather conditions, and so forth).

Furthermore, optionally, a given monitoring entity is configured to process its own performance-specific observations by at least one of:
performing mathematical operations on individual observations, groups of observations, or series of observations,
performing statistical operations on groups or series of observations,
inferring complex observations from simple observations (for example, such as transmission rate, loss rate, goodput, throughput, Quality-of-Service (QoS), user-perceived Quality-of-Experience (QoE) and so forth).

Optionally, in order for a given monitoring entity to be able to process the performance-specific observations, processing instructions are coded into the given monitoring entity by way of a software application. Optionally, the software application is updated via software updates from time-to-time.

Optionally, the processing instructions are updated based upon the events observed and recorded at the given monitoring entity. Optionally, in this regard, the processing instructions are updated by using machine learning techniques.

Optionally, the processing instructions depend on configuration parameters that are adjusted according to changing requirements of the at least one streaming media session.

Furthermore, the present disclosure also relates to the aforementioned system as described above. Various embodiments and variants disclosed above apply mutatis mutandis to the system.

Optionally, the size of the at least one window is determined as at least one of: a given time duration, a given count of consecutive packet sequence numbers, a given count of consecutive frame numbers, a given count of consecutive timestamps, a given series or count of events, a given series or count of semantic observations.

Optionally, the at least one window comprises at least one time window, wherein the at least one reporting entity is configured to determine the size of the at least one window based upon at least one of:
round-trip delays between the plurality of monitoring entities,
one-way delays between the plurality of monitoring entities in opposite directions,
round-trip delays from individual monitoring entities to the at least one reporting entity,
one-way delays from the individual monitoring entities to the at least one reporting entity,
delays in processing the plurality of observation reports at corresponding monitoring entities and/or at the at least one reporting entity,
waiting time for which the at least one reporting entity waited to collect the plurality of observation reports from the plurality of monitoring entities.

Optionally, the at least one reporting entity is configured to determine the size of the at least one window and to analyze the plurality of observation reports recursively.

Optionally, the at least one reporting entity is configured to determine the size of the at least one window dynamically, based upon the correlation between the events.

Optionally, the at least one reporting entity is configured to:
analyze at least one of the plurality of observation reports to detect an occurrence of at least one initial event during the at least one streaming media session; and
be triggered, based upon the at least one initial event, to determine the size of the at least one window.

Optionally, when analyzing the plurality of observation reports, the at least one reporting entity is configured to detect, in at least one other of the plurality of observation reports, at least one correlated event in future or past with respect to the at least one initial event.

Optionally, when analyzing the plurality of observation reports, the at least one reporting entity is configured to detect a correlation between a first anomalous event and a second anomalous event belonging to a same category when the first anomalous event and the second anomalous event occur within the at least one window, the first anomalous event and the second anomalous event being detected, respectively, for a first observation report and a second observation report from amongst the plurality of observation reports.

Optionally, the at least one reporting entity is configured to determine the size of the at least one window dynamically, based upon the category to which the first anomalous event and the second anomalous event belong.

Moreover, optionally, for the given observation report, the information pertaining to the events comprises data values of a plurality of metrics as recorded at the corresponding monitoring entity.

Optionally, the at least one window comprises at least a first window and a second window, the first window being shorter than the second window, wherein when analyzing the plurality of observation reports, the at least one reporting entity is configured to:
employ a statistical inference technique to check whether or not a first distribution of data values of at least one of the plurality of metrics in the first window is different from a second distribution of the data values of the at least one of the plurality of metrics in the second window and to determine a score indicative of an extent of difference between the first distribution and the second distribution; and
detect a presence of an anomalous event when the score is greater than or equal to a predefined threshold score.

Additionally or alternatively, optionally, when analyzing the plurality of observation reports, the at least one reporting entity is configured to:
store historical data values of the plurality of metrics as recorded in a plurality of historical observation reports;
calculate from the historical data values a multivariate normal distribution across the plurality of metrics;

calculate, for a given event recorded in the given observation report, a probability of occurrence of the given event provided the multivariate normal distribution; and detect the given event as an anomalous event when the calculated probability is lower than a predefined threshold probability.

Optionally, in this regard, when identifying the problem, the at least one reporting entity is configured to:

calculate a conditional probability for a given metric from amongst the plurality of metrics provided a set of data values of other metrics from amongst the plurality of metrics; and detect the given metric as an anomalous metric when the calculated conditional probability is lower than a predefined threshold conditional probability.

Furthermore, optionally, in a given observation report, the events are recorded on a local timeline of the corresponding monitoring entity, wherein when analyzing the plurality of observation reports, the at least one reporting entity is configured to adjust, in the plurality of observation reports, local timelines of the plurality of monitoring entities with respect to a local clock of the at least one reporting entity.

Optionally, the at least one reporting entity is configured to analyze the plurality of observation reports with respect to:

a monitoring entity that is a communicating entity transmitting packets to one or more other communicating entities during the at least one streaming media session, or a monitoring entity that is nearest to the communicating entity transmitting the packets.

Optionally, the at least one reporting entity is configured to analyze the plurality of observation reports for at least one of:

per media stream communicated during a given streaming media session, per streaming media session across at least a subset of media streams communicated during a given streaming media session, per media type within a given streaming media session or across a plurality of streaming media sessions, across a plurality of streaming media sessions.

Optionally, the at least one streaming media session comprises a plurality of streaming media sessions, wherein the at least one reporting entity is configured to select the plurality of streaming media sessions across which the plurality of observation reports are to be analyzed, wherein the plurality of streaming media sessions are to be selected using an aggregation scheme.

Optionally, the at least one reporting entity comprises a plurality of reporting entities, wherein a given reporting entity is configured to:

determine other reporting entities from amongst the plurality of reporting entities at which the plurality of observation reports are being collected; and exchange, with the other reporting entities, information indicative of one or more types of events that are to be correlated.

For illustration purposes only, there will now be considered an example network environment, wherein a system for improving performance of at least one streaming media session between a plurality of communicating entities is implemented pursuant to embodiments of the present disclosure. One such network environment has been illustrated in conjunction with FIGS. 1A and 1B as explained in more detail below.

The network environment comprises a plurality of communicating entities, at least one network entity, a plurality of monitoring entities and at least one reporting entity.

A streaming media session is setup between the plurality of communicating entities, wherein the at least one network entity forwards packets between the plurality of communicating entities.

The at least one network entity as well as at least one of the plurality of communicating entities are configured to act as monitoring entities. Each monitoring entity is configured to observe and record events pertaining to the streaming media session. Moreover, each monitoring entity is configured to send an observation report to the at least one reporting entity.

The at least one reporting entity is configured to analyze observation reports collected from the plurality of monitoring entities, to determine a correlation between the events across the observation reports. The at least one reporting entity is configured to identify, based upon the correlation between the events, a problem encountered during the streaming media session. The at least one reporting entity is configured to send at least one notification to at least one of the plurality of monitoring entities, when required.

DETAILED DESCRIPTION OF THE DRAWINGS

Figure 1B:
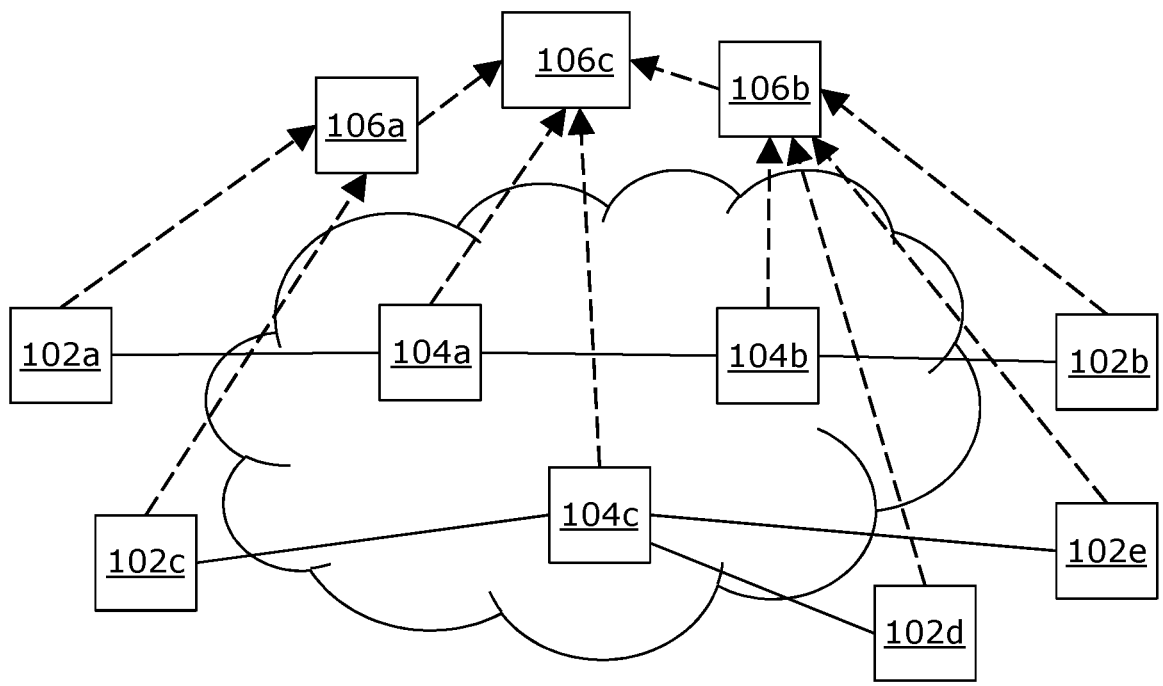

Referring now to the drawings, particularly by their reference numbers, FIGS. 1A and 1B collectively are a schematic illustration of a network environment, wherein a system for improving performance of at least one streaming media session between a plurality of communicating entities is implemented pursuant to embodiments of the present disclosure.

The network environment comprises:

a plurality of communicating entities, depicted as communicating entities 102a, 102b, 102c, 102d and 102e (hereinafter collectively referred to as the communicating entities 102), at least one network entity, depicted as network entities 104a, 104b and 104c (hereinafter collectively referred to as the network entities 104), and at least one reporting entity, depicted as reporting entities 106a, 106b and 106c (hereinafter collectively referred to as the reporting entities 106).

With reference to FIG. 1A, the communicating entities 102a and 102b communicate via the network entities 104a and 104b, while the communicating entities 102c, 102d and 102e communicate via the network entity 104c.

It is assumed that a monitoring entity co-resides with each of the communicating entities 102 and the network entities 104, and therefore, delivers its own observation report to the reporting entity 106c either directly or via the reporting entities 106a and 106b. Thus, there are a plurality of monitoring entities that are depicted by 102a, 102b, 102c, 102d, 102e, 104a, 104b and 104c.

With reference to FIG. 1B, the monitoring entities co-residing with the communicating entities 102a and 102c deliver their observation reports to the reporting entity 106c via the reporting entity 106a; the monitoring entities co-residing with the network entities 104a and 104c deliver their observation reports to the reporting entity 106c directly; the monitoring entities co-residing with the communicating entities 102b, 102d and 102e and the network entity 104b deliver their observation reports to the reporting entity 106c via the reporting entity 106b.

FIGS. 1A and 1B are merely examples, which should not unduly limit the scope of the claims herein. It is to be understood that the specific designation for the network environment is provided as an example and is not to be construed as limiting the network environment to specific numbers, types, or arrangements of communicating entities, network entities and reporting entities. FIGS. 1A and 1B aim to illustrate a network environment topology, whereas data flows between the communicating entities may differ. A person skilled in the art will recognize many variations, alternatives, and modifications of embodiments of the present disclosure. As an example, one of the communicating entities 102c, 102d and 102e could be an automated entity, for example such as a conference server, that is responsible for setting up a conference call between the other two of the communicating entities 102c, 102d and 102e. As another example, the network entity 104c could be replaced with a communicating entity.

Figure 2A:
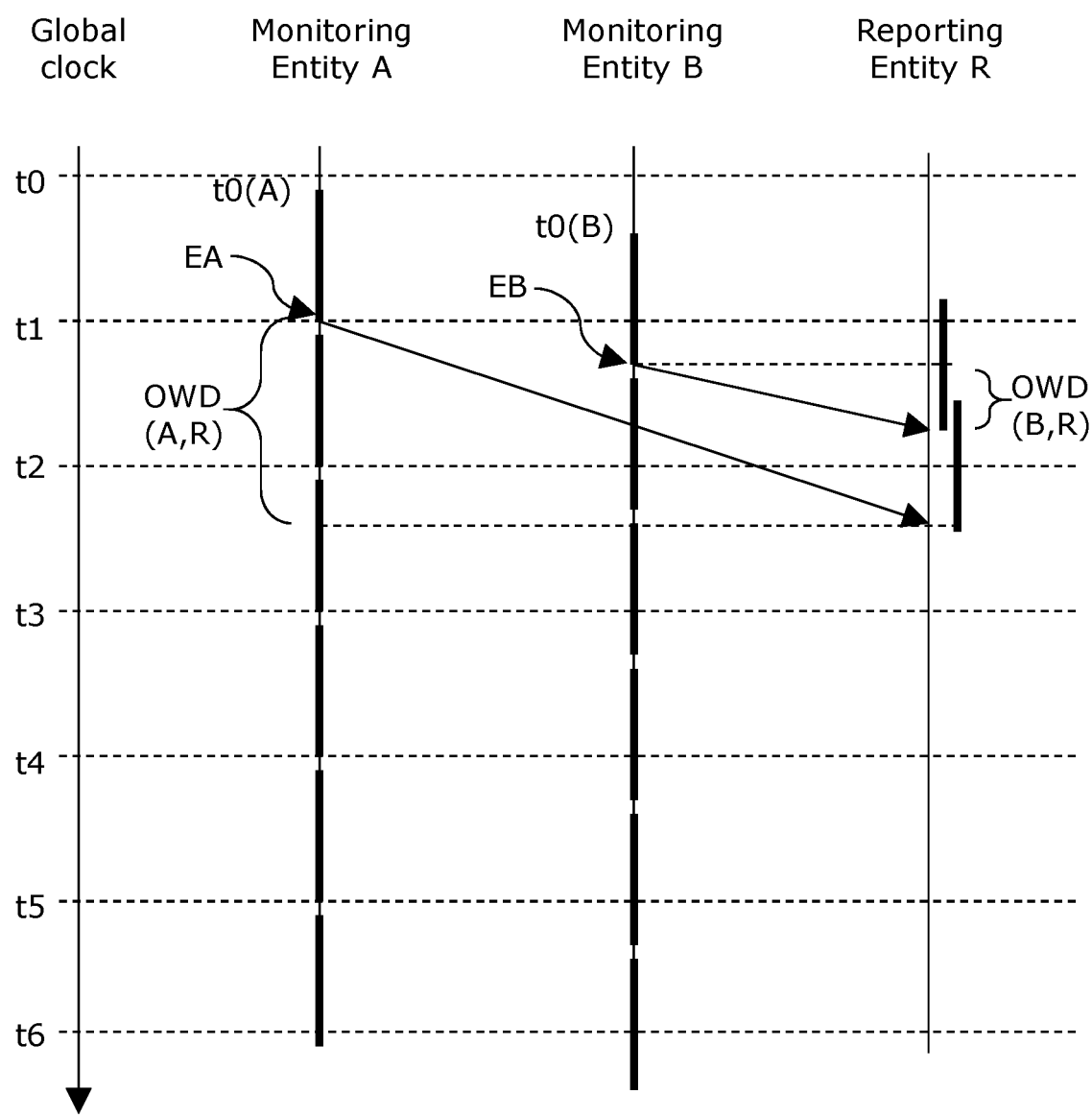
FIG. 2A is a schematic illustration of a first example scenario wherein communicating entities receive packets, for example, from a conference bridge during a streaming media session, and are configured to act as monitoring entities, in accordance with an embodiment of the present disclosure.

FIG. 2A is a schematic illustration of a first example scenario wherein communicating entities 'A' and 'B' receive packets, for example, from a conference bridge 'C', during a streaming media session, and are configured to act as monitoring entities, in accordance with an embodiment of the present disclosure.

In operation, the monitoring entity 'A' records a "packet-loss" event 'EA' at a local time 't0(A)', and sends its observation report to a reporting entity 'R'. The observation report comprising information pertaining to the event 'EA' is received after an OWD from A to R, represented by 'OWD (A, R)'.

Meanwhile, in operation, the monitoring entity 'B' records a "packet-loss" event 'EB' at a local time 't0(B)', and sends its observation report to the reporting entity 'R'. The observation report comprising information pertaining to the event 'EB' is received after an OWD from B to R, represented by 'OWD (B, R)'.

The events 'EA' and 'EB' are observed and recorded at different absolute times on the global clock, due to different OWDs from the conference bridge 'C' to the communicating entities 'A' and 'B'.

Figure 2B:
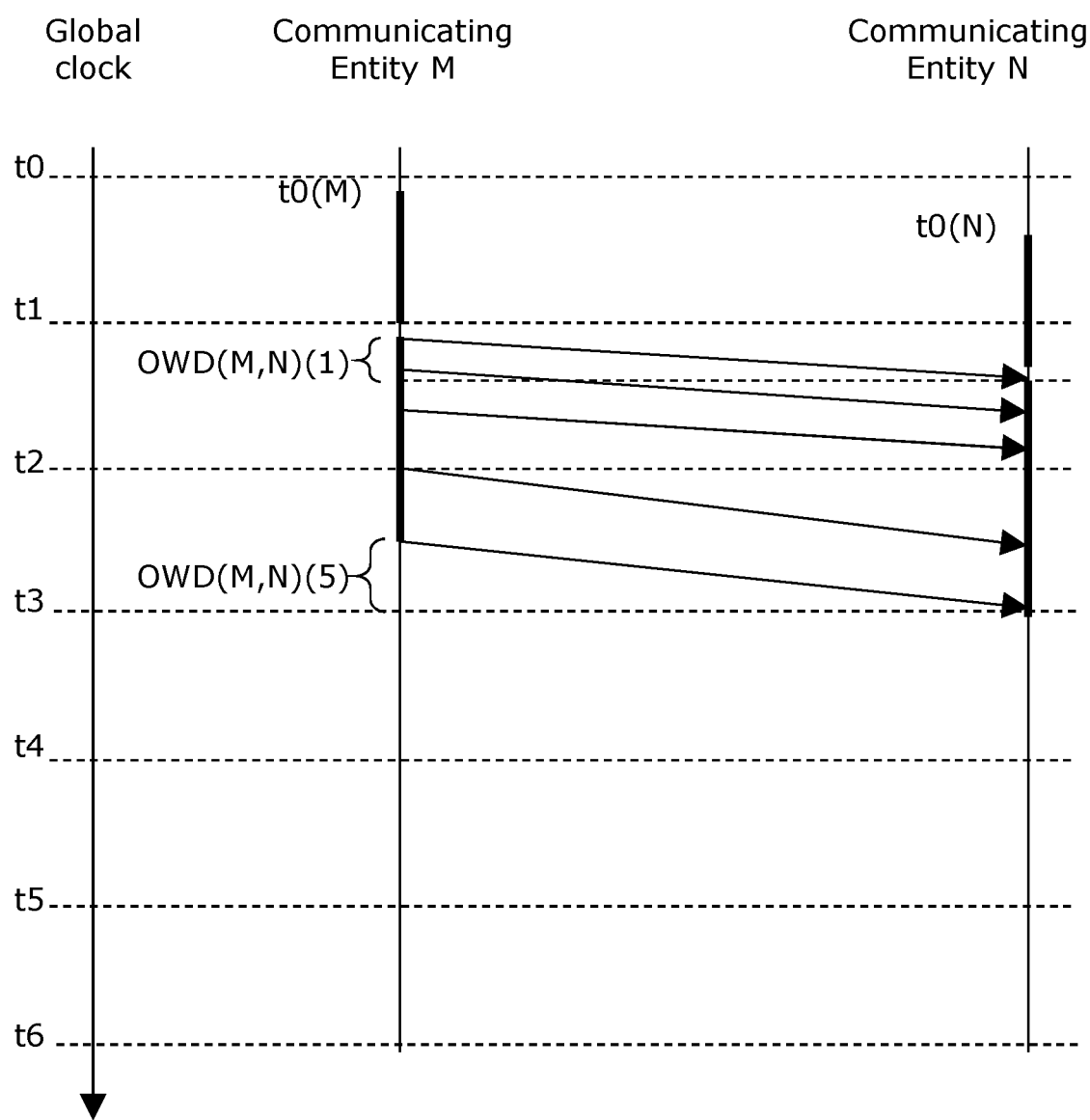
FIG. 2B is a schematic illustration of a second example scenario wherein communicating entities are communicating directly during a streaming media session, and are configured to act as monitoring entities, in accordance with an embodiment of the present disclosure.

FIG. 2B is a schematic illustration of a second example scenario wherein communicating entities 'M' and 'N' are communicating directly during a streaming media session, and are configured to act as monitoring entities, in accordance with an embodiment of the present disclosure.

There is shown a One-Way Delay (OWD) from M to N, represented by 'OWD (M, N)'. The one-way delay 'OWD (M, N)' is not constant, namely varies with time. As shown, the OWD for a first packet (represented by 'OWD (M, N) (1)') is smaller than the OWD for a fifth packet (represented by 'OWD (M, N) (5)').

The monitoring entities 'M' and 'N' report the events recorded thereat to a same reporting entity 'R'. In operation, the monitoring entity 'M' records a transmission event and sends its observation report to R. Likewise, the monitoring entity 'N' records a corresponding reception event and sends its observation report to R. If the local time of the monitoring entities 'M' and 'N' were synchronized, t0(N)=t0(M)+OWD (M, N).

In operation, the reporting entity 'R' analyzes the observation reports received from M and N to determine a correlation between the transmission and reception events observed at M and N, respectively. This enables the reporting entity 'R' to check whether or not a transmission progress of the communicating entity 'M' is aligned with a reception progress of the communicating entity 'N'.

Figure 2C:
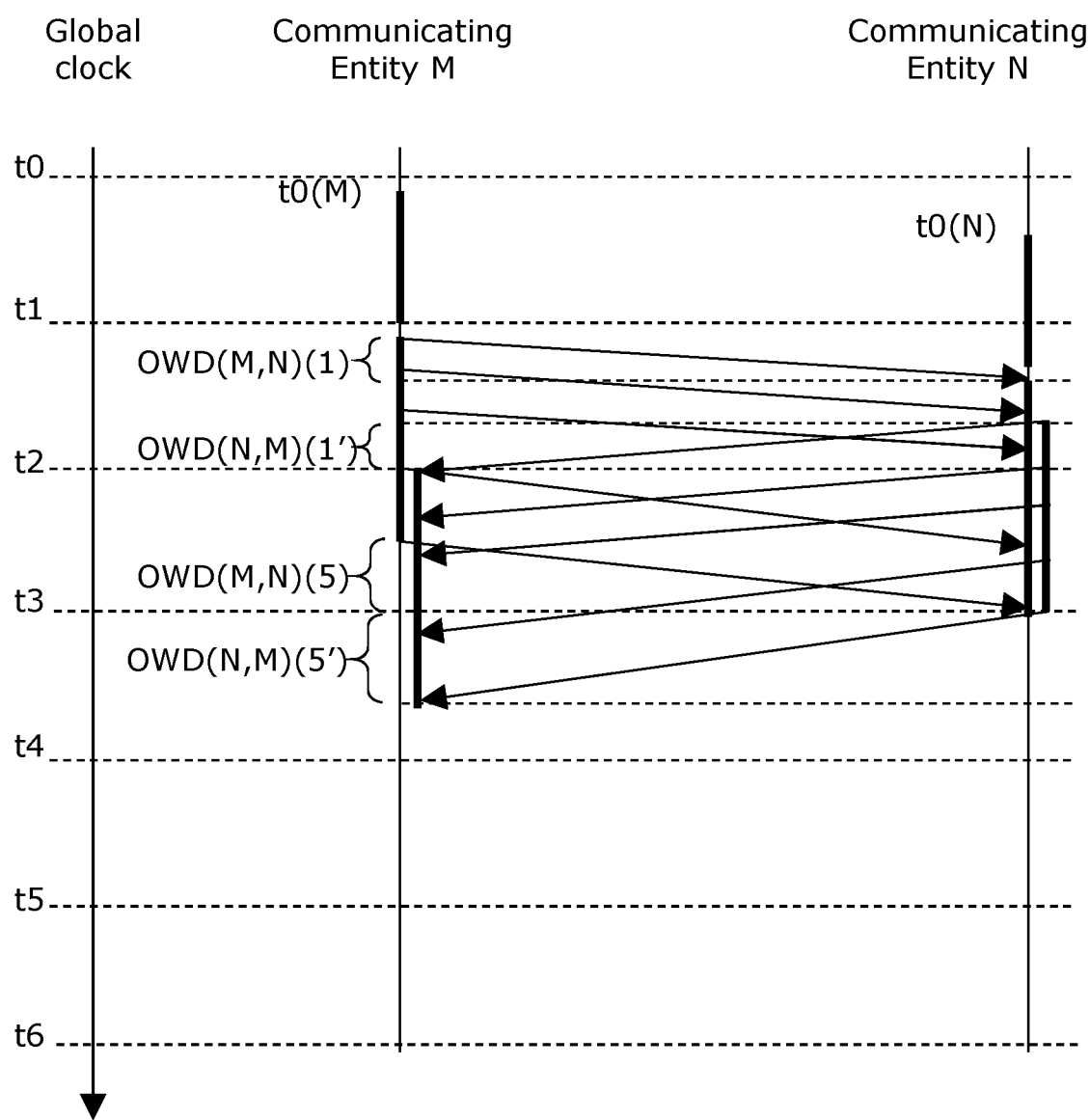
FIG. 2C is a schematic illustration of a third example scenario wherein communicating entities are exchanging packets during the streaming media session, and are configured to act as monitoring entities, in accordance with an embodiment of the present disclosure.

FIG. 2C is a schematic illustration of a third example scenario wherein both of the communicating entities 'M' and 'N' are exchanging packets during the streaming media session, and are configured to act as monitoring entities, in accordance with an embodiment of the present disclosure.

Similar to the One-Way Delay (OWD) from M to N (represented by 'OWD (M, N)'), there is shown an OWD from N to M, represented by 'OWD (N, M)'. Notably, the one-way delays 'OWD (M, N)' and 'OWD (N, M)' are not constant, namely vary with time. As shown, the OWD from M to N for a first packet (represented by 'OWD (M, N) (1)') is smaller than the OWD from M to N for a fifth packet (represented by 'OWD (M, N) (5)'); the OWD from N to M for a first packet (represented by 'OWD (N, M) (1)') is smaller than the OWD from N to M for a fifth packet (represented by 'OWD (M, N) (5')').

The reporting entity 'R' optionally analyzes the observation reports with respect to each transmitting entity. This enables the reporting entity 'R' to correlate transmission and reception events associated with packets originating from that transmitting entity.

FIGS. 2A, 2B and 2C are merely examples, which should not unduly limit the scope of the claims herein. A person skilled in the art will recognize many variations, alternatives, and modifications of embodiments of the present disclosure.

Figure 3:
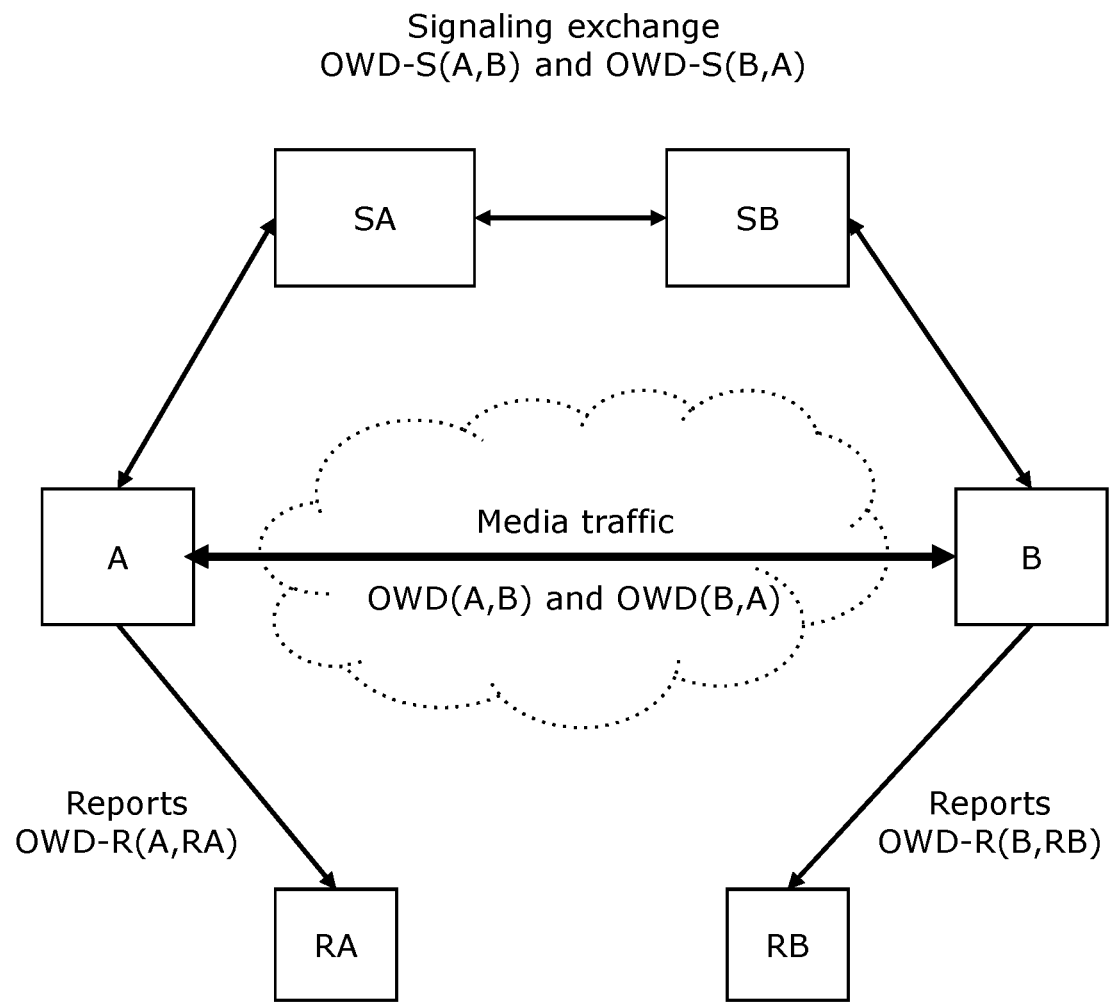
FIG. 3 is a schematic illustration of an example scenario wherein communicating entities create a streaming media session for communicating with each, and are configured to act as monitoring entities, in accordance with an embodiment of the present disclosure.

FIG. 3 is a schematic illustration of an example scenario wherein communicating entities 'A' and 'B' create a streaming media session for communicating with each, and are configured to act as monitoring entities, in accordance with an embodiment of the present disclosure.

Signalling servers 'SA' and 'SB' are employed to set up a connection between A and B. The signalling path from A to B has a one-way delay 'OWD-S (A, B)', whereas the signalling path from B to A has a one-way delay 'OWD-S (B, A)'.

Typically, these signalling paths are slowest as compared to the direct connection between A and B. In other words, OWD-S (A, B) is greater than OWD (A, B), namely an OWD of media traffic from A to B; OWD-S (B, A) is greater than OWD (B, A), namely an OWD of media traffic from B to A. Therefore, the OWDs of the signalling paths can be utilized as an upper bound for the OWDs of the media traffic.

Moreover, there is shown that A and B deliver their observation reports to different reporting entities 'RA' and 'RB', respectively. The observation report delivered by A arrives at RA after a one-way delay from A to RA 'OWD-R (A, RA)', whereas the observation report delivered by B arrives at RB after a one-way delay from B to RB 'OWD-R (B, RB)'.

FIG. 3 is merely an example, which should not unduly limit the scope of the claims herein. A person skilled in the art will recognize many variations, alternatives, and modifications of these example scenarios. For example, there can be more than two servers and reporting entities, or just one server and reporting entity.

Figure 4:
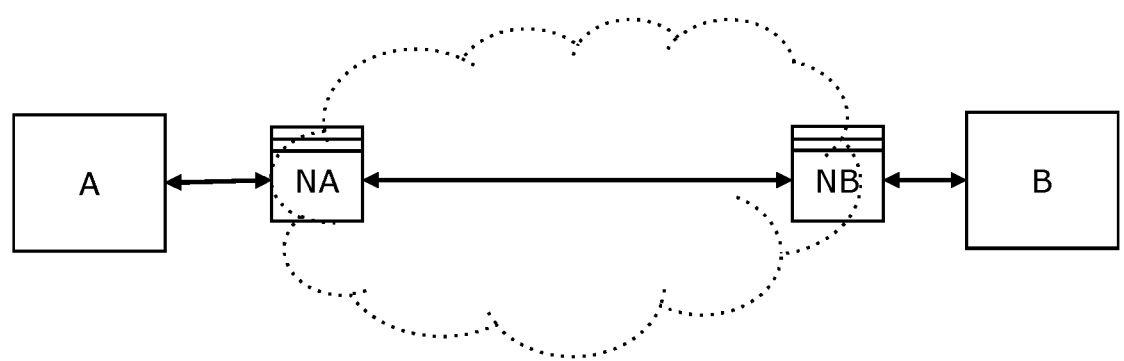
FIG. 4 is a schematic illustration of another example scenario wherein apart from or instead of the communicating entities, network entities are configured to act as monitoring entities, in accordance with an embodiment of the present disclosure.

FIG. 4 is a schematic illustration of another example scenario wherein apart from or instead of the communicating entities 'A' and 'B', network entities 'NA' and 'NB' are configured to act as monitoring entities, in accordance with an embodiment of the present disclosure.

One-Way Delays (OWDs) between the network entities 'NA' and 'NB' are smaller than the OWDs between the communicating entities 'A' and 'B'. Therefore, the OWDs between A and B can be utilized as an upper bound of the OWDs between NA and NB, because the network entities 'NA' and 'NB' cannot measure the OWDs and RTDs easily.

FIG. 4 is merely an example, which should not unduly limit the scope of the claims herein. A person skilled in the art will recognize many variations, alternatives, and modifications of these example scenarios.

Figure 5:
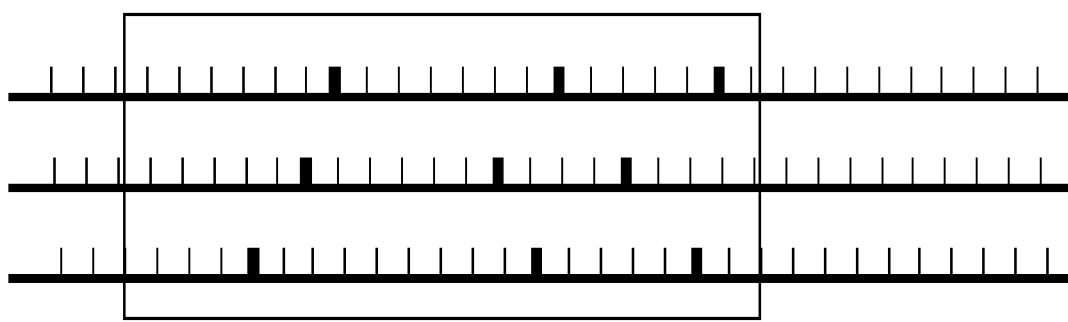
FIG. 5 is a schematic illustration of an example window that is used for correlating events across a plurality of observation reports, in accordance with an embodiment of the present disclosure.

FIG. 5 is a schematic illustration of an example window that is used for correlating events across a plurality of observation reports, in accordance with an embodiment of the present disclosure.

FIG. 5 is merely an example, which should not unduly limit the scope of the claims herein. A person skilled in the art will recognize many variations, alternatives, and modifications of these example scenarios.

Figure 6:
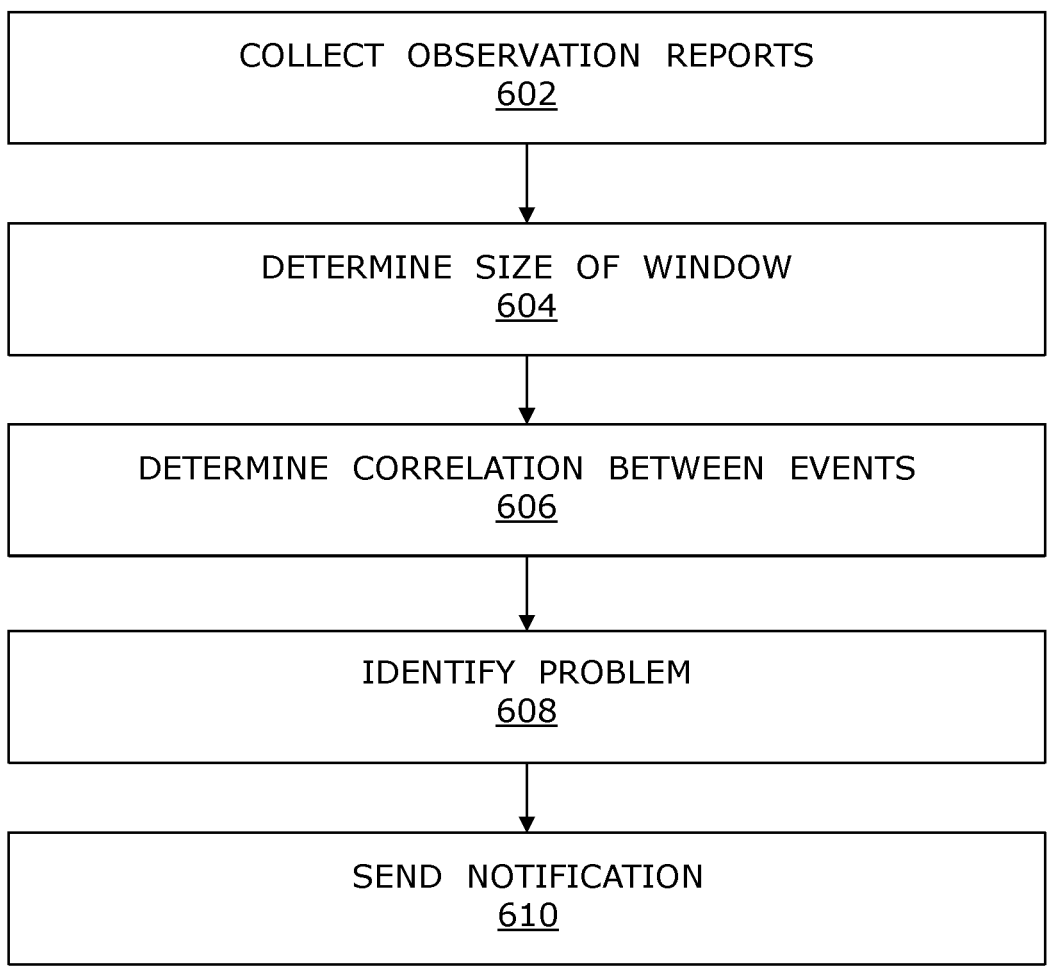
FIG. 6 is an illustration of steps of a method for improving performance of at least one streaming media session between a plurality of communicating entities, in accordance with an embodiment of the present disclosure.

FIG. 6 is an illustration of steps of a method for improving performance of at least one streaming media session between a plurality of communicating entities, in accordance with an embodiment of the present disclosure. The method is depicted as a collection of steps in a logical flow diagram, which represents a sequence of steps that can be implemented in hardware, software, firmware or a combination thereof.

The method is implemented by way of at least one reporting entity.

At step 602, a plurality of observation reports are collected from a plurality of monitoring entities. A given observation report comprises information pertaining to events observed and recorded at a corresponding monitoring entity.

At step 604, a size of at least one window to be used for analyzing the plurality of observation reports is determined.

At step 606, the plurality of observation reports are analyzed using the at least one window of the determined size, to determine a correlation between the events across the plurality of observation reports.

At step 608, a problem encountered during the at least one streaming media session is identified based upon the correlation between the events.

At step 610, at least one notification is sent to at least one of the plurality of monitoring entities, based upon the problem. The at least one notification is sent during the at least one streaming media session.

The steps 602 to 610 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method for communicating information concerning at least one streaming media session between a plurality of communicating entities, the method comprising:
    collecting a plurality of observation reports from a plurality of monitoring entities, a given observation report comprising information pertaining to events observed and recorded at a corresponding monitoring entity, wherein the plurality of observation reports are collected by at least one reporting entity;
    determining a size of at least one window to be used for analyzing the plurality of observation reports;
    analyzing the plurality of observation reports using the at least one window of the determined size, to determine a correlation between the events across the plurality of observation reports;
    identifying, based upon the correlation between the events, a problem encountered during the at least one streaming media session; and
    sending at least one notification to at least one of the plurality of monitoring entities, based upon the problem, wherein the at least one notification is sent during the at least one streaming media session.

2. The method according to claim 1, wherein the size of the at least one window is determined as at least one of: a given time duration, a given count of consecutive packet sequence numbers, a given count of consecutive frame numbers, a given count of consecutive timestamps, a given series or count of events, a given series or count of semantic observations.

3. The method according to claim 1, wherein the at least one window comprises at least one time window, wherein the size of the at least one window is determined based upon at least one of:
    round-trip delays between the plurality of monitoring entities,
    one-way delays between the plurality of monitoring entities in opposite directions,
    round-trip delays from individual monitoring entities to the at least one reporting entity,
    one-way delays from the individual monitoring entities to the at least one reporting entity,
    delays in processing the plurality of observation reports at corresponding monitoring entities and/or at the at least one reporting entity,
    waiting time for which the at least one reporting entity waited to collect the plurality of observation reports from the plurality of monitoring entities.

4. The method according to claim 1, wherein the step of determining the size of the at least one window and the step of analyzing the plurality of observation reports are performed recursively.

5. The method according to claim 1, wherein the step of analyzing the plurality of observation reports comprises detecting a correlation between a first anomalous event and a second anomalous event belonging to a same category when the first anomalous event and the second anomalous event occur within the at least one window, the first anomalous event and the second anomalous event being detected, respectively, for a first observation report and a second observation report from amongst the plurality of observation reports.

6. The method according to claim 5, wherein the size of the at least one window is determined dynamically, based upon the category to which the first anomalous event and the second anomalous event belong.

7. The method according to claim 1, wherein, for the given observation report, the information pertaining to the events comprises data values of a plurality of metrics as recorded at the corresponding monitoring entity, and wherein the at least one window comprises at least a first window and a second window, the first window being shorter than the second window, wherein the step of analyzing the plurality of observation reports comprises:
    employing a statistical inference technique to check whether or not a first distribution of data values of at least one of the plurality of metrics in the first window is different from a second distribution of the data values of the at least one of the plurality of metrics in the second window and to determine a score indicative of an extent of difference between the first distribution and the second distribution; and detecting a presence of an anomalous event when the score is greater than or equal to a predefined threshold score.

8. The method according to claim 1, wherein, for the given observation report, the information pertaining to the events comprises data values of a plurality of metrics as recorded at the corresponding monitoring entity, wherein the step of analyzing the plurality of observation reports comprises:

storing historical data values of the plurality of metrics as recorded in a plurality of historical observation reports;

calculating from the historical data values a multivariate normal distribution across the plurality of metrics;

calculating, for a given event recorded in the given observation report, a probability of occurrence of the given event provided the multivariate normal distribution; and detecting the given event as an anomalous event when the calculated probability is lower than a predefined threshold probability.

9. The method according to claim 8, wherein the step of identifying the problem comprises:

calculating a conditional probability for a given metric from amongst the plurality of metrics provided a set of data values of other metrics from amongst the plurality of metrics; and detecting the given metric as an anomalous metric when the calculated conditional probability is lower than a predefined threshold conditional probability.

10. The method according to claim 1, further comprising:

analyzing at least one of the plurality of observation reports to detect an occurrence of at least one initial event during the at least one streaming media session; and triggering, based upon the at least one initial event, the at least one reporting entity to perform the step of determining the size of the at least one window.

11. The method according to claim 10, wherein the step of analyzing the plurality of observation reports comprises detecting, in at least one other of the plurality of observation reports, at least one correlated event in future or past with respect to the at least one initial event.

12. The method according to claim 1, wherein the plurality of observation reports are analyzed with respect to:

a monitoring entity that is a communicating entity transmitting packets to one or more other communicating entities during the at least one streaming media session, or a monitoring entity that is nearest to the communicating entity transmitting the packets.

13. The method according to claim 1, wherein the plurality of observation reports are analyzed for at least one of:

per media stream communicated during a given streaming media session, per streaming media session across at least a subset of media streams communicated during a given streaming media session, per media type within a given streaming media session or across a plurality of streaming media sessions, across a plurality of streaming media sessions.

14. The method according to claim 1, wherein the at least one streaming media session comprises a plurality of streaming media sessions, wherein the method comprises selecting the plurality of streaming media sessions across which the plurality of observation reports are to be analyzed, the plurality of streaming media sessions being selected using an aggregation scheme.

15. The method according to claim 1, wherein the plurality of monitoring entities comprise at least one of: at least one of the plurality of communicating entities, at least one network entity forwarding at least one media stream between the plurality of communicating entities.

16. A system for communicating information concerning at least one streaming media session between a plurality of communicating entities, the system comprising at least one reporting entity having computer-processing circuitry that is configured to:

collect a plurality of observation reports from a plurality of monitoring entities, a given observation report comprising information pertaining to events observed and recorded at a corresponding monitoring entity;

determine a size of at least one window to be used for analyzing the plurality of observation reports;

analyze the plurality of observation reports using the at least one window of the determined size, to determine a correlation between the events across the plurality of observation reports;

identify, based upon the correlation between the events, a problem encountered during the at least one streaming media session; and send at least one notification to at least one of the plurality of monitoring entities, based upon the problem, wherein the at least one notification is to be sent during the at least one streaming media session.

17. The system according to claim 16, wherein the size of the at least one window is determined as at least one of: a given time duration, a given count of consecutive packet sequence numbers, a given count of consecutive frame numbers, a given count of consecutive timestamps, a given series or count of events, a given series or count of semantic observations.

18. The system according to claim 16, wherein the at least one window comprises at least one time window, wherein the at least one reporting entity is configured to determine the size of the at least one window based upon at least one of:

round-trip delays between the plurality of monitoring entities, one-way delays between the plurality of monitoring entities in opposite directions, round-trip delays from individual ones of the plurality of monitoring entities to the at least one reporting entity, one-way delays from the individual monitoring entities to the at least one reporting entity, delays in processing the plurality of observation reports at corresponding monitoring entities and/or at the at least one reporting entity, waiting time for which the at least one reporting entity waited to collect the plurality of observation reports from the plurality of monitoring entities.

19. The system according to claim 16, wherein the at least one reporting entity is configured to determine the size of the at least one window and to analyze the plurality of observation reports recursively.

20. The system according to claim 16, wherein when analyzing the plurality of observation reports, the at least one reporting entity is configured to detect a correlation between a first anomalous event and a second anomalous event belonging to a same category when the first anomalous event and the second anomalous event occur within the at least one window, the first anomalous event and the second anomalous event being detected, respectively, for a first observation report and a second observation report from amongst the plurality of observation reports.

21. The system according to claim 20, wherein the at least one reporting entity is configured to determine the size of the at least one window dynamically, based upon the category to which the first anomalous event and the second anomalous event belong.

22. The system according to claim 16, wherein, for the given observation report, the information pertaining to the events comprises data values of a plurality of metrics as recorded at the corresponding monitoring entity, and wherein the at least one window comprises at least a first window and a second window, the first window being shorter than the second window, wherein when analyzing the plurality of observation reports, the at least one reporting entity is configured to:
employ a statistical inference technique to check whether or not a first distribution of data values of at least one of the plurality of metrics in the first window is different from a second distribution of the data values of the at least one of the plurality of metrics in the second window and to determine a score indicative of an extent of difference between the first distribution and the second distribution; and
detect a presence of an anomalous event when the score is greater than or equal to a predefined threshold score.

23. The system according to claim 16, wherein, for the given observation report, the information pertaining to the events comprises data values of a plurality of metrics as recorded at the corresponding monitoring entity, wherein when analyzing the plurality of observation reports, the at least one reporting entity is configured to:
store historical data values of the plurality of metrics as recorded in a plurality of historical observation reports;
calculate from the historical data values a multivariate normal distribution across the plurality of metrics;
calculate, for a given event recorded in the given observation report, a probability of occurrence of the given event provided the multivariate normal distribution; and
detect the given event as an anomalous event when the calculated probability is lower than a predefined threshold probability.

24. The system according to claim 23, wherein when identifying the problem, the at least one reporting entity is configured to:
calculate a conditional probability for a given metric from amongst the plurality of metrics provided a set of data values of other metrics from amongst the plurality of metrics; and
detect the given metric as an anomalous metric when the calculated conditional probability is lower than a predefined threshold conditional probability.

25. The system according to claim 16, wherein the at least one reporting entity is configured to:
analyze at least one of the plurality of observation reports to detect an occurrence of at least one initial event during the at least one streaming media session; and
be triggered, based upon the at least one initial event, to determine the size of the at least one window.

26. The system according to claim 25, wherein when analyzing the plurality of observation reports, the at least one reporting entity is configured to detect, in at least one other of the plurality of observation reports, at least one correlated event in future or past with respect to the at least one initial event.

27. The system according to claim 16, wherein the at least one reporting entity is configured to analyze the plurality of observation reports with respect to a monitoring entity from among the plurality of monitoring entities that is: a communicating entity transmitting packets to one or more other communicating entities during the at least one streaming media session; or nearest to the communicating entity transmitting the packets.

28. The system according to claim 16, wherein the at least one reporting entity is configured to analyze the plurality of observation reports for at least one of:
per media stream communicated during a given streaming media session,
per streaming media session across at least a subset of media streams communicated during a given streaming media session,
per media type within a given streaming media session or across a plurality of streaming media sessions,
across a plurality of streaming media sessions.

29. The system according to claim 16, wherein the at least one streaming media session comprises a plurality of streaming media sessions, wherein the at least one reporting entity is configured to select the plurality of streaming media sessions across which the plurality of observation reports are to be analyzed, wherein the plurality of streaming media sessions are to be selected using an aggregation scheme.

30. The system according to claim 16, wherein the plurality of monitoring entities includes at least one of: one or more of the plurality of communicating entities, and at least one network entity configured to forward at least one media stream between the plurality of communicating entities, wherein each said at least one network entity includes circuitry to communicate, by sending and/or receiving, digital data.

* * * * *